US011468773B2

(12) United States Patent
Caldwell et al.

(10) Patent No.: US 11,468,773 B2
(45) Date of Patent: Oct. 11, 2022

(54) LANE CLASSIFICATION FOR IMPROVED VEHICLE HANDLING

(71) Applicant: Zoox, Inc., Foster City, CA (US)

(72) Inventors: Timothy Caldwell, Mountain View, CA (US); William Anthony Silva, San Francisco, CA (US); Matthew Van Heukelom, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 388 days.

(21) Appl. No.: 16/546,241

(22) Filed: Aug. 20, 2019

(65) Prior Publication Data

US 2021/0056853 A1    Feb. 25, 2021

(51) Int. Cl.
| | | |
|---|---|---|
| *G08G 1/16* | (2006.01) | |
| *G05D 1/02* | (2020.01) | |
| *G06V 20/58* | (2022.01) | |
| *G06V 20/56* | (2022.01) | |

(52) U.S. Cl.
CPC ........... *G08G 1/167* (2013.01); *G05D 1/0219* (2013.01); *G05D 1/0221* (2013.01); *G06V 20/58* (2022.01); *G06V 20/588* (2022.01)

(58) Field of Classification Search
None
See application file for complete search history.

(56) References Cited

U.S. PATENT DOCUMENTS

| | | | |
|---|---|---|---|
| 9,612,123 B1 | 4/2017 | Levinson et al. | |
| 10,146,223 B1 | 12/2018 | Luders et al. | |
| 10,353,390 B2 | 7/2019 | Linscott et al. | |
| 10,829,121 B1 | 11/2020 | Allan et al. | |
| 2016/0187879 A1* | 6/2016 | Mere | B60W 50/082 701/23 |
| 2017/0351926 A1 | 12/2017 | Nagase et al. | |
| 2018/0259957 A1 | 9/2018 | Charrow et al. | |
| 2019/0049242 A1 | 2/2019 | Adams et al. | |
| 2019/0049566 A1 | 2/2019 | Adams et al. | |
| 2019/0061765 A1* | 2/2019 | Marden | G05D 1/0214 |
| 2019/0171206 A1 | 6/2019 | Abrams et al. | |
| 2019/0212749 A1* | 7/2019 | Chen | B62D 15/0255 |

(Continued)

OTHER PUBLICATIONS

Office Action for U.S. Appl. No. 16/546,224, dated Mar. 29, 2021, Caldwell, "Lane Handling for Merge Prior To Turn", 22 pages.

(Continued)

*Primary Examiner* — Adam D Tissot
*Assistant Examiner* — Garrett F Evans
(74) *Attorney, Agent, or Firm* — Lee & Hayes, P.C.

(57) ABSTRACT

Techniques described herein are directed to classifying lanes in an environment of a vehicle for, for example, performing lane handling. In an example, system(s) of a vehicle can determine a signal indicative of a presence of the vehicle in a lane of a drivable surface in an environment within which the vehicle is located. The system(s) can determine, based at least in part on the signal, a classification of the lane as at least one of occupied (an object is at least partially in the lane), unoccupied (no object in the lane), and/or established (e.g., where an object has established a priority in the lane). The system(s) can control the vehicle based at least in part on the classification of the lane to improve safety in scenarios, for example, including merging.

20 Claims, 11 Drawing Sheets

(56) References Cited

U.S. PATENT DOCUMENTS

| | | |
|---|---|---|
| 2019/0263401 A1 | 8/2019 | Yoo et al. |
| 2020/0174475 A1 | 6/2020 | Min et al. |
| 2020/0200547 A1 | 6/2020 | Miller et al. |
| 2020/0208998 A1 | 7/2020 | Xiang et al. |
| 2020/0242922 A1 | 7/2020 | Dulberg et al. |
| 2020/0298858 A1 | 9/2020 | Stenneth et al. |
| 2020/0310428 A1 | 10/2020 | Li et al. |
| 2020/0372793 A1 | 11/2020 | Weizman |
| 2021/0055732 A1 | 2/2021 | Caldwell et al. |
| 2021/0064057 A1 | 3/2021 | Eldar et al. |
| 2021/0158698 A1 | 5/2021 | Leung |

OTHER PUBLICATIONS

Office Action for U.S. Appl. No. 16/546,224, dated Jul. 23, 2021, Caldwell, "Lane Handling for Merge Prior To Turn", 14 pages.
PCT Search Report and Written Opinion dated Nov. 20, 2020 for PCT application No. PCT/US20/47058, 15 pages.
International Preliminary Report on Patentability for PCT Application No. PCT/US20/47058, dated Mar. 3, 2022, 10 pages.

* cited by examiner

LANE CLASSIFICATION FOR IMPROVED VEHICLE HANDLING

BACKGROUND

An autonomous vehicle often includes a perception system to capture sensor data of an environment. The perception system allows the autonomous vehicle to perceive objects in the environment. Further, an autonomous vehicle often includes a planning system to plan routes for controlling the autonomous vehicle through the environment. Such a planning system may plan routes in view of various scenarios that the autonomous vehicle encounters in the environment, such as multiple traffic lanes, junctions, parking lanes, bike lanes, and the like.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
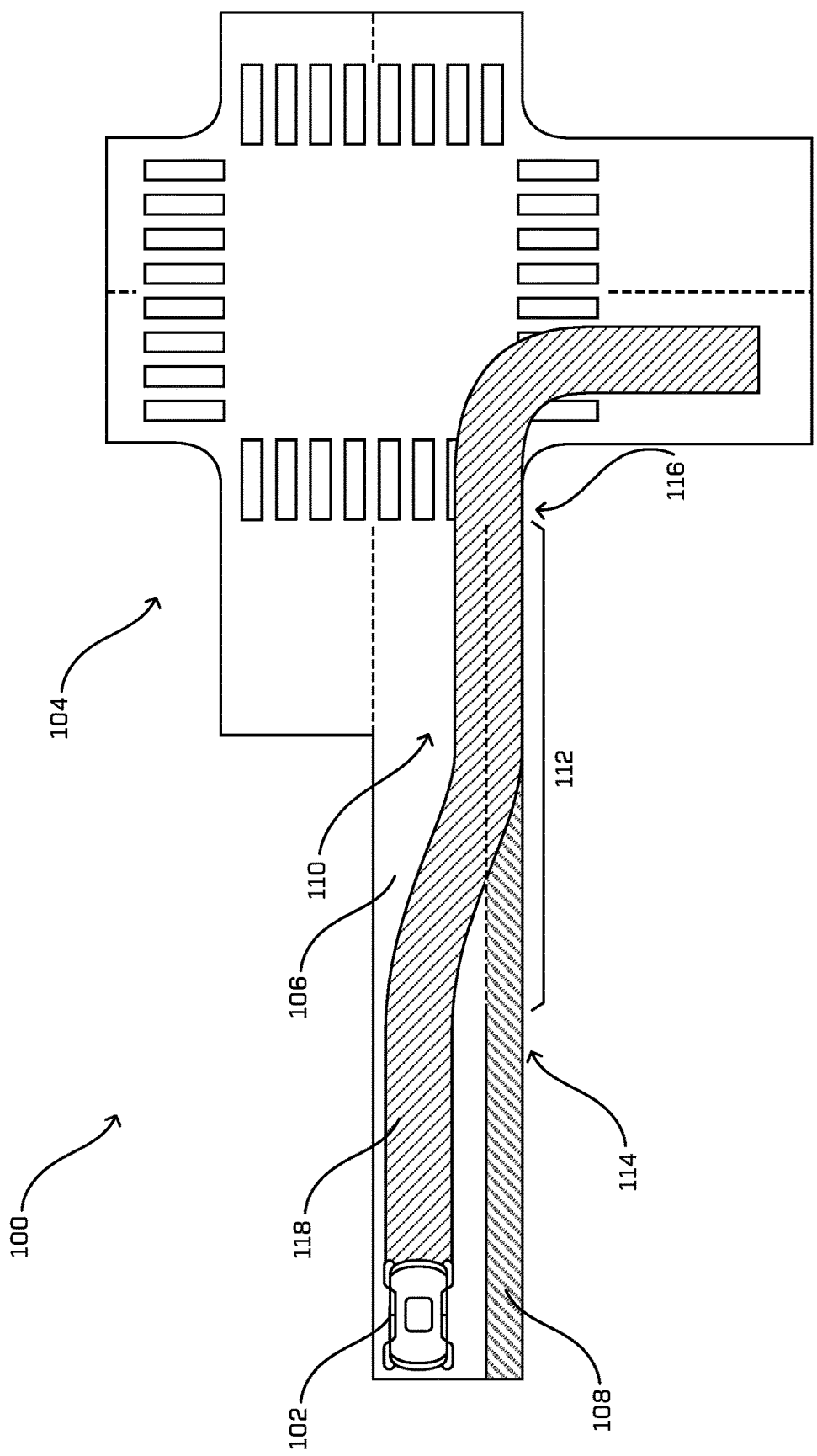
FIG. 1 illustrates an example of a vehicle performing lane handling techniques, as described herein.

Techniques described herein relate to performing, by a vehicle, lane handling techniques to control the vehicle in an environment. In an example, the vehicle can be associated with a drive mission that requires the vehicle to perform a turn in association with a junction. In some examples, a turning lane can precede the junction such that the vehicle is to merge into the turning lane prior to executing the turn. In at least one example, a turning lane can be associated with a bike lane. In such an example, the vehicle is to merge into the bike lane prior to executing the turn. Techniques described herein enable the vehicle to merge (or otherwise maneuver) into a turning lane, as described above, prior to executing a turn at a junction while ensuring safety of any objects (vehicle, bikes, etc.) in such a lane.

In at least one example, the vehicle can consider one or more preconditions prior to generating an instruction to perform an action for controlling the vehicle to merge into a turning lane and execute a turn at a junction. Such preconditions, as described below, can include determining whether there is an indication of a junction upcoming in a drive mission of the vehicle, determining whether there is an indication of a second lane associated with the junction to facilitate a turn at the junction, determining whether the drive mission includes a turn at the junction, determining whether the vehicle can merge into the second lane (e.g., is there a valid action trajectory, no blockage, etc.), and so on. Such precondition(s) can be evaluated in view of a state of the vehicle, a drive mission of the vehicle, and/or one or more maps, which can be any number of data structures modeled in two dimensions, 2.5 dimensions, three dimensions, or N dimensions that are capable of providing information about an environment, such as, but not limited to, topologies (such as junctions, lanes, merging zones, etc.), streets, mountain ranges, roads, terrain, and the environment in general, where N can be any number greater than or equal to 1.

In some examples, the vehicle can determine a classification for the current lane (and/or neighboring lane(s) to the left and/or right of the current lane) prior to performing an action and/or during an action. Such classification can represent a state of the vehicle relative to the current lane (or another lane for which a classification is being determined). Such a classification can be determined based on a determined signal, which can be indicative of a presence of the vehicle (or other object, such as a bicycle) in the current lane (or another lane for which a classification is being determined). In at least one example, such a signal can be determined based, at least in part on, a position of a front bumper of the vehicle, a dimension of a bounding box associated with the vehicle relative to a lane reference of the lane, an area of the bounding box associated with the vehicle, a ratio of a first width of the lane that is occupied by the vehicle to a second width of the lane that is unoccupied, and the like. In at least one example, the vehicle can classify the current lane as an established lane, an occupied lane, or an unoccupied lane. An established lane is a lane where the portion of the vehicle that occupies the lane is enough for the vehicle to have priority and/or right-of-way in the lane. An occupied lane is a lane where any portion of the vehicle (or a bounding box associated therewith) is in the lane. An unoccupied lane is a lane that is not occupied by any portion of the vehicle (or the bounding box associated therewith). Such classifications can be used to determine what operations the vehicle is to perform prior to performing the action and/or while performing the action. For instance, the vehicle can perform a cut-in analysis (e.g., to determine whether another object is in a target lane and/or whether the vehicle's intended action is predicted to negatively affect the other object) until the vehicle is determined to be established in a target lane. Additional details and examples are described below.

Techniques described herein enable flexible lane handling to enable vehicles to navigate sophisticated scenarios and unique lane geometries. Existing techniques are limited to two lane classifications (e.g., primary and secondary). However, techniques described herein enable the vehicle to classify two or more lanes, for instance, when the vehicle occupies more than two lanes. Furthermore, techniques described herein enable the vehicle to better understand lanes having a variety of widths and/or lanes of varying types (e.g., driving lanes, bike lanes, bus and/or taxi lanes, parking lanes, etc.). For instance, techniques described herein enable flexible lane handling to enable vehicles to navigate merging into a turning lane and/or a bike lane prior to executing a turn at a junction. Similarly, techniques described herein enable flexible lane handling to enable a vehicle to navigate scenarios such as nudging slightly into a lane to avoid another vehicle nudging into their lane from an opposite side, and the like. As such, techniques described herein offer improved navigation and safety in controlling vehicles, such as with autonomous vehicles as described below.

The techniques described herein can be implemented in a number of ways. Example implementations are provided below with reference to the following figures. Example implementations are discussed in the context of autonomous vehicles; however, the methods, apparatuses, and systems described herein can be applied to a variety of systems (e.g., a sensor system or a robotic platform), and are not limited to autonomous vehicles. In one example, the techniques described herein may be utilized in driver-controlled vehicles in which such a system may provide an indication to a driver of the vehicle of whether it is safe to perform various maneuvers. In another example, the techniques can be utilized in an aviation or nautical context, robotic manufacturing or warehousing scenarios, or in any system involving objects that may be associated with behavior that is unknown to the system. Additionally, the techniques described herein can be used with real data (e.g., captured using sensor(s)), simulated data (e.g., generated by a simulator), or any combination of the two.

FIG. 1 illustrates an example of a vehicle performing lane handling techniques, as described herein. FIG. 1 depicts a portion of an environment 100, wherein a vehicle 102 is positioned. In at least one example, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 102 is an autonomous vehicle; however, the vehicle 102 could be any other type of vehicle.

The environment 100 includes a junction 104, where two or more roads are joined. In at least one example, one of the roads can be associated with a driving lane 106 and a bike lane 108. The driving lane 106 can be a lane in which the vehicle 102 can drive. The bike lane 108 can be a lane in which bicycles (e.g., bikes, cyclists, etc.) can travel. In some examples, a bike lane before a junction can include a broken lane boundary, lane marking, or other indicator (hereinafter "indicator") indicating that a vehicle is allowed to merge, at least partially, into the bike lane to execute a turn when completing a turn at such a junction. In the environment 100, the bike lane 108 includes an indicator 110 indicating that vehicles approaching the junction 104 are to merge, at least partially, into the bike lane 108 to execute a turn. While illustrated as an explicit indicator 110 in FIG. 1, in an alternative example, the bike lane 108 may not be associated with an explicit indicator, and instead the presence of the bike lane 108 and/or the merging zone 112 can be inferred. For instance, in at least one example, the vehicle 102 can detect a start of a reference line in the bike lane 108 and can thus determine that the vehicle 102 is supposed to merge into the bike lane 108 prior to performing a turn at the junction 104.

In at least one example, driving lanes, bike lanes, and other aspects of the environment 100 can be associated with a map. As described above, a map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments.

In at least one example, the vehicle 102 can be associated with a sensor system, which can include light detection and ranging (LIDAR) sensors, radio detection and ranging (RADAR) sensors, ultrasonic transducers, sound navigation and ranging (SONAR) sensors, location sensors (e.g., global positioning system (GPS), compass, etc.), inertial sensors (e.g., inertial measurement units, accelerometers, magnetometers, gyroscopes, etc.), cameras (e.g., red, green blue (RGB), infrared (IR), intensity, depth, etc.), wheel encoders, microphones, environment sensors (e.g., temperature sensors, humidity sensors, light sensors, pressure sensors, etc.), Time of Flight (ToF) sensors, etc. Additional details associated with the sensor system are described below. Nevertheless, the sensor system can generate sensor data associated with the environment 100.

In at least one example, the vehicle 102 can include system(s) that utilize map data associated with map(s), as described above, and/or sensor data received from the sensor system and can generate a drive mission for the vehicle 102. The drive mission can comprise a plurality of trajectories along which the vehicle 102 is to follow to drive along a route. The system(s) can scan ahead for the nearest junction in the scanning horizon, where the vehicle 102 is to merge into a bike lane prior to turning. In at least one example, the system(s) can determine that the vehicle 102 is to perform a right turn at the junction 104. Additionally, the system(s) can determine that the bike lane 108 is proximate to the driving lane 106 and that the bike lane 108 is associated with the indicator 110, indicating that the vehicle 102 is to merge, at least partially, into the bike lane 108 to execute the right turn. In at least one example, and for the purpose of this discussion, the portion of the bike lane 108 with which the indicator 110 is associated (e.g., from the start of the indicator 110 to the end of the bike lane 108) can be called a "merging zone," which is shown in the environment 100 as merging zone 112. The merging zone 112 can be associated with a beginning 114, which can correspond to a beginning of the indicator 110, and an end 116, which can correspond with the end of the bike lane 108 (e.g., where the bike lane 108 turns into the junction 104). Of course, though depicted in FIG. 1 as a continuous lane for illustrative purposes, such a bike lane 108 may exist for a finite distance from an intersection, be associated with a turn for a vehicle (as opposed to a bike), be located on the left for a left turn, be associated with a parking lane (as opposed to a bike lane), be associated with a bus lane (as opposed to a bus lane), or the like.

In at least one example, the system(s) of the vehicle 102 can determine an action that controls the vehicle 102 to merge (e.g., right) into the bike lane 108 and execute the right turn. FIG. 1 includes an action trajectory 118 for the action that controls the vehicle 102 to merge (e.g., right) into the bike lane 108 and execute the right turn. That is, the action trajectory 118 shows the trajectory along which the vehicle 102 is likely to travel when the action is executed. In at least one example, the system(s) can determine that the one or more preconditions are satisfied prior to determining such an action. Such preconditions can include determining whether there is an indication of a junction upcoming in a drive mission of the vehicle 102, determining whether there is an indication of a second lane associated with the junction to facilitate a turn at the junction, determining whether the drive mission includes a turn at the junction, determining whether the vehicle 102 can merge into the second lane (e.g., is there a valid action trajectory, no blockage, etc.), and so on.

Assuming that each of the precondition(s) are satisfied, the system(s) can execute the action, thereby controlling the vehicle 102 to merge (e.g., right) into the bike lane 108. In at least one example, execution of such an action can be initiated by transitioning a reference point for the vehicle 102 from a first position to a second position. Additional details associated with execution of an action to control the vehicle 102 to merge (e.g., right) into the bike lane 108 prior to performing a right turn are described below with reference to FIG. 2. As illustrated in FIG. 1, the vehicle 102 and/or associated action trajectory 118 may not be fully contained in the bike lane 108 and thus, in at least one example, can occupy at least a portion of the driving lane 106 and a portion of the bike lane 108 at the same time.

Figure 2:
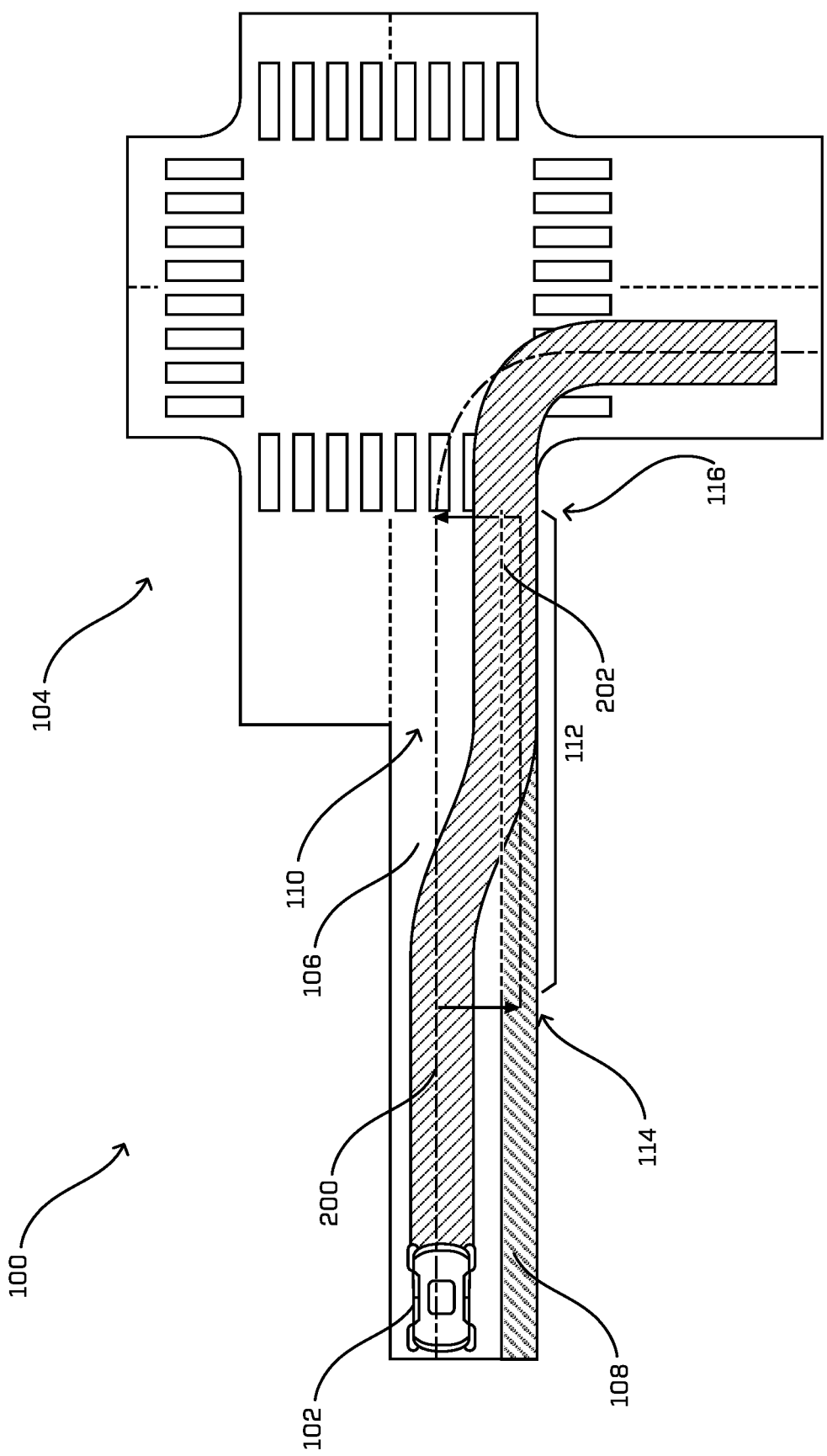
FIG. 2 illustrates another example of a vehicle performing lane handling techniques, as described herein.

FIG. 2 illustrates another example of a vehicle performing lane handling techniques, as described herein. FIG. 2 illustrates additional details associated with executing an action that controls the vehicle 102 to merge (e.g., right) into the bike lane 108 and execute the right turn. As illustrated in FIG. 2, the vehicle 102 can be tracking a reference 200 in the driving lane 106. That is, the vehicle 102 can follow the reference 200 while in the driving lane 106. In at least one example, the system(s) of the vehicle 102 can determine a location of the vehicle 102 relative to the beginning 114 of the merging zone 112. In such an example, the system(s) can identify the bike lane 108 as a target lane and can determine whether (i) the bike lane 108 is occupied by another object and/or has another object that is already established in the bike lane 108 or (ii) merging would negatively affect the other object. That is, the system(s) can perform a "cut-in" analysis to determine whether it is safe for the vehicle 102 to merge into the bike lane 108 (e.g., free of collision and/or uncomfortable braking for the other object). As a non-limiting example of discomfort, despite being able to enter the lane, merging may cause the other object to come within a threshold distance of the vehicle and/or decelerate at rate which is uncomfortable for the occupants therein. Additional details associated with the cut-in analysis are described below.

In at least one example, the system(s) can identify a reference 202 in the bike lane 108. In at least one example, the reference 202 can extend at least the length of the merging zone 112. In at least one example, the system(s) can determine a first cost based at least in part on a first distance of the vehicle 102 from the reference 200 and a second cost based at least in part on a second distance of the vehicle 102 from the reference 202. The system(s) can thus cause the vehicle 102 to merge based at least in part on the first cost and the second cost. That is, in at least one example, based at least in part on the first cost and the second cost, the vehicle 102 can modify the reference of the vehicle 102 from the reference 200 to the reference 202. Such a modification causes the vehicle 102 switch (laterally) from a first reference 200 to a second reference 202. The vehicle 102 can then track (e.g., follow) the reference 202 for the duration of the bike lane 108 (e.g., until the location of the vehicle 102 is determined to be associated with the end 116 of the merging zone 112).

Based at least in part on determining that the vehicle 102 is in a location that corresponds to the end 116 of the merging zone 112, the system(s) can again modify the reference of the vehicle 102 from the reference 202, back to the reference 200. In such an example, the system(s) can determine a first cost based at least in part on a first distance of the vehicle 102 from the reference 202 and a second cost based at least in part on a second distance of the vehicle 102 from the reference 200. The system(s) can thus cause the vehicle 102 to merge based at least in part on the first cost and the second cost. Based at least in part on the system(s) again modifying the reference of the vehicle 102, the vehicle 102 can then track (e.g., follow) the reference 200 while making the right turn. Two arrows are illustrated in FIG. 2 to depict where the transitions between references occur.

In some examples, such transitions may not occur exactly where depicted, but can occur within a threshold distance thereof. In at least one example, the system(s) can include a reference smoother to smooth the transitions between references as described herein. Furthermore, in some examples, such transitions can be discretized such that the vehicle 102 can transition from the reference 200 to the reference 202 (or back) more gradually than is shown in FIG. 2. That is, instead of modifying the reference 200 to the reference 202 at or near the beginning 114 of the merging zone 112 and back to the reference 200 at the end 116 of the merging zone, the system(s) can modify the reference at a higher frequency with less lateral movement in each transition to effectuate the same (or similar) reference change. Moreover, in at least one example, such transitions can be hyperbolic.

In at least one example, in association with performing the action, the system(s) can perform a follow operation and/or a cut-in analysis to ensure the safety of the vehicle 102 and cyclists in the bike lane 108. For example, the follow operation is responsible for ensuring that the vehicle 102 follows other vehicles (or other objects) in the driving lane 106 and/or the bike lane 108 while completing the action. The cut-in analysis is responsible for detecting cyclists (or other objects) in the bike lane 108 that the vehicle 102 is to consider when executing the action. The cut-in analysis can check whether there is a safe time gap to other objects in the target lane (e.g., the bike lane 108 if the vehicle 102 is driving in the driving lane 106). If the time gap is below a threshold (associated with a "safe" time gap), the vehicle 102 can refrain from merging into the bike lane 108.

Figure 3:
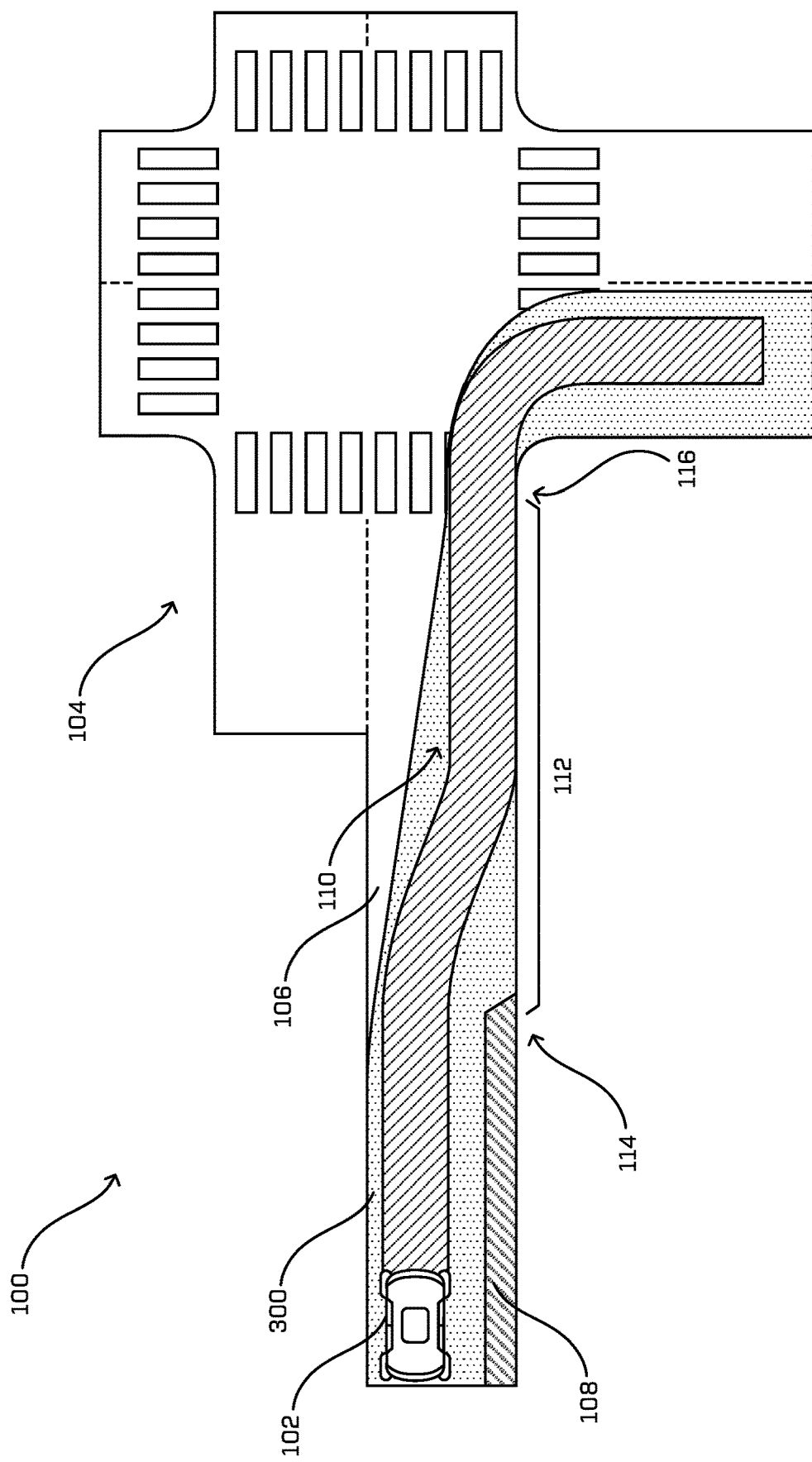
FIG. 3 illustrates yet another example of a vehicle performing lane handling techniques, as described herein.

FIG. 3 illustrates yet another example of a vehicle performing lane handling techniques, as described herein. In at least one example, to facilitate the merge into the bike lane 108 and the right turn, a driving corridor 300 can be dynamically defined and/or modified by the system(s) of the vehicle 102. The driving corridor 300 can define the portion of the environment 100 where the vehicle 102 can drive (e.g., a drivable region). In at least one example, the system(s) of the vehicle 102 can expand the right side of the driving corridor 300 into the bike lane 108 at or near the beginning 114 of the merging zone 112. Additionally, the system(s) of the vehicle 102 can cause the left side of the driving corridor 300 to taper to limit the lateral movement of the vehicle 102 (e.g., so that the vehicle 102 does not nudge laterally back into the driving lane 106). In at least one example, the taper can reduce the driving corridor 300 by approximately the width of the bike lane 108, or to a width that is equal to the width of the vehicle 102 plus a predetermined margin. In some examples, the driving corridor 300 can additionally be modified, in near real-time, to accommodate pedestrians (off-road or on-road pedestrians that are determined to be blocking the vehicle 102) and prevent the vehicle 102 from moving laterally toward the pedestrians. In at least one example, after the vehicle 102 makes the turn, the driving corridor 300 can expand on the left side (e.g., to the width of the driving lane). Restricting the left side of the driving corridor 300 during the turn can reduce the nudging or otherwise restrict the lateral motion of the vehicle 102. In at least one example, the system(s) can utilize object fusion to modify the driving corridor 300 based at least in part on the presence of objects in the environment. Additional details associated with object fusion are described with reference to U.S. patent application Ser. No. 15/982,694, filed on May 17, 2018, the entire contents of which are incorporated by reference herein.

Figure 4:
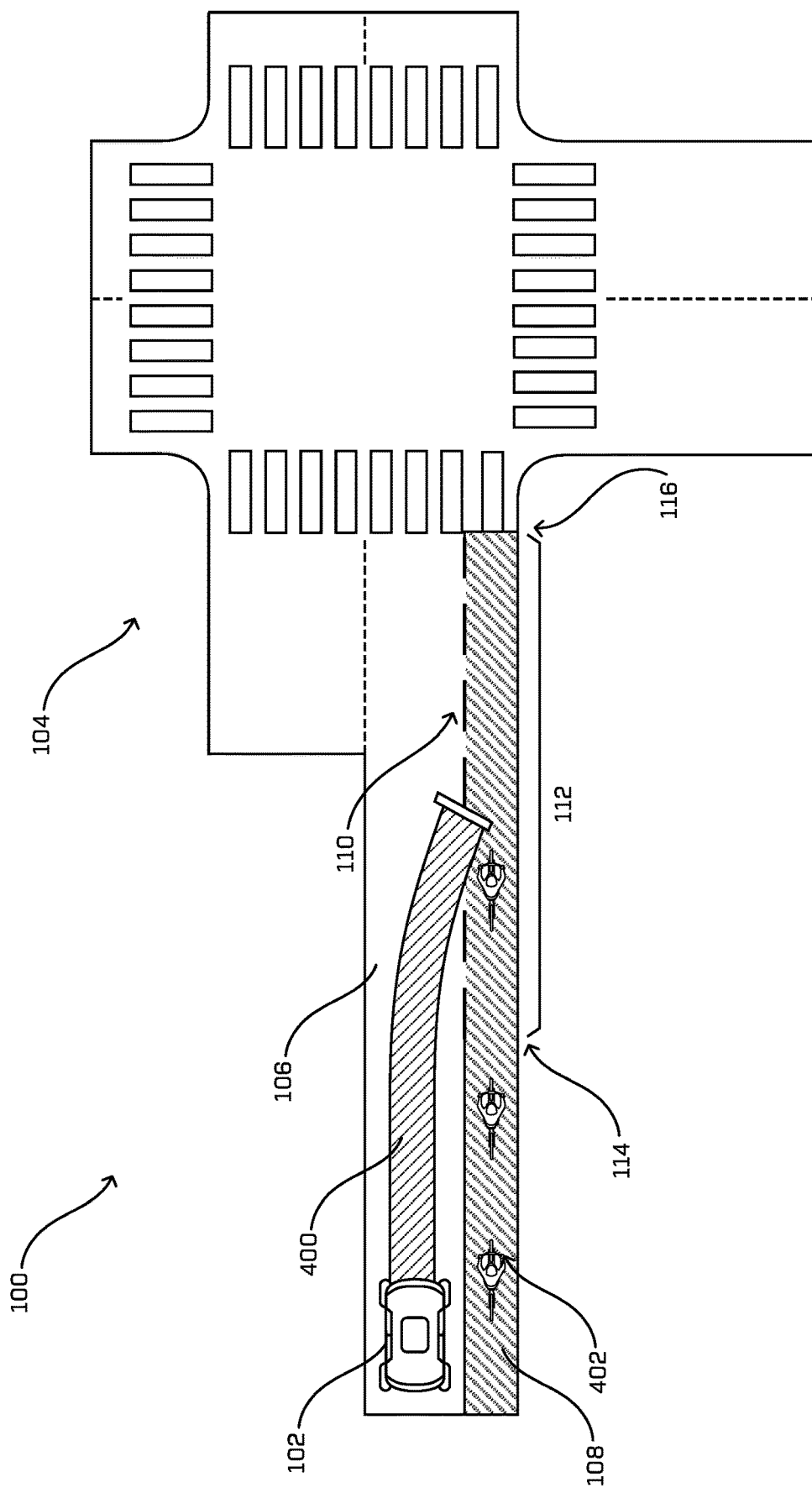
FIG. 4 illustrates an example of a vehicle performing an abort action in association with lane handling techniques, as described herein.

FIG. 4 illustrates an example of a vehicle performing an abort action in association with lane handling techniques, as described herein. In some examples, the system(s) of the vehicle 102 may execute an abort action to control the vehicle 102 to come to a stop along the indicator 110. In some examples, the system(s) can consider whether an abort action should be executed while the system(s) consider whether an action controlling the vehicle 102 to merge prior to turning right should be executed. In FIG. 4, the vehicle 102 is not able to merge into the bike lane 108, and thus opts to execute the abort action, because of the presence of bicycles 402 (and/or other objects) in the bike lane 108.

In at least one example, the system(s) of the vehicle 102 can determine to execute an abort action, which controls the vehicle 102 to stop along the indicator 110. In some examples, the system(s) of the vehicle 102 can determine whether the vehicle 102 is established in the bike lane 108 prior to determining whether to execute an abort action. If the vehicle 102 is established in the bike lane 108, the system(s) of the vehicle 102 may refrain from executing the abort action. FIG. 4 includes an action trajectory 400, which shows the trajectory along which the vehicle 102 is likely to travel (e.g., to a stop) when the abort action is executed. That is, when executed, the abort action described with reference to FIG. 4 can control the vehicle 102 to stop along the indicator 110. In at least one example, a longitudinal acceleration constraint can be utilized to control deceleration (and thus attempt to prevent the abort action causing the vehicle 102 to slam on the brakes).

In some examples, the system(s) can perform one or more other operations to ensure the safety of the vehicle 102 and/or cyclists (or other objects) during the abort action. For instance, the system(s) can perform a follow operation and/or a cut-in analysis to ensure the safety of the vehicle 102 and cyclists in the bike lane 108, as described above. Furthermore, in at least one example, the system(s) can perform a merge operation to prepare the vehicle 102 for a lane change. For example, the system(s) can modify a longitudinal profile of the vehicle 102 and can utilize the output of the cut-in analysis to determine if there are any conflicting objects in the target lane (e.g., the bike lane 108). If the system(s) detect an object that causes a conflict (e.g., if the vehicle 102 merges it is predicted to negatively affect the object), the system(s) can control the vehicle 102 to slow behind the object to merge. In such an example, the vehicle 102 can remain in-lane and can perform a follow operation to slow down and allow the object to pass.

In at least one example, the driving corridor described above with reference to FIG. 3 can be dynamically modified in association with the abort action. For instance, the right side of the driving corridor can expand into the bike lane 108, for example, at or near the beginning 114 of the merging zone 112. Additionally, the left side of the driving corridor can taper towards the bike lane 108 to limit lateral movement of the vehicle 102.

Figure 5:
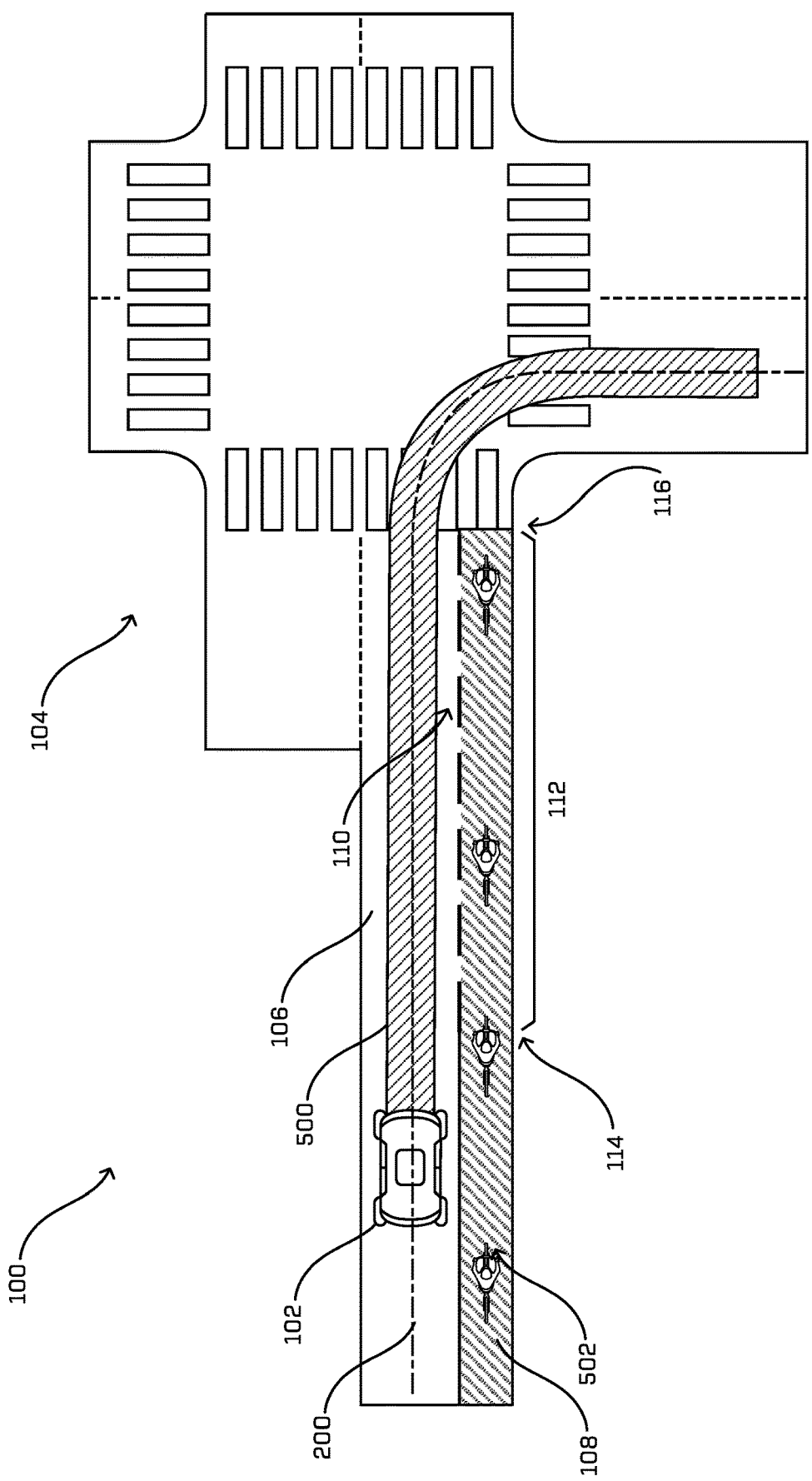
FIG. 5 illustrates another example of a vehicle performing an abort action in association with lane handling techniques, as described herein.

FIG. 5 illustrates another example of a vehicle performing an abort action in association with lane handling techniques, as described herein. In FIG. 5, the abort action can control the vehicle 102 to slow down but not come to a complete stop. Instead, the system(s) of the vehicle 102 can cause the vehicle 102 to stop lateral motion and continue driving along its current lane bias. FIG. 5 includes an action trajectory 500, which shows the trajectory along which the vehicle 102 is likely to travel when the abort action is executed. In FIG. 5, the vehicle 102 is not able to merge into the bike lane 108, and thus opts to execute the abort action, because of the presence of bicycles 502 (and/or other objects) in the bike lane 108.

In at least one example, the vehicle 102 can track (e.g., follow) the reference 200 of the driving lane 106 for the duration of the driving lane 106. In some examples, if the abort action is initiated prior to the vehicle 102 moving laterally, the vehicle 102 can track (e.g., follow) the reference 200, without modifying the reference. However, if the system(s) of the vehicle 102 determine to initiate an abort action when the vehicle 102 is moving laterally (e.g., nudging towards the bike lane 108), the vehicle 102 can track that bias until the end 116 of the merging zone 112. That is, in such an example, the vehicle 102 can modify the reference of the vehicle 102 from the reference 200 to another reference (laterally offset from the reference 200, but not the reference 202) to enable the vehicle 102 to follow the other reference until the vehicle 102 executes the turn.

In some examples, the system(s) can perform one or more other operations to ensure the safety of the vehicle 102 and/or cyclists (or other objects) during the abort action. For instance, the system(s) can perform a follow operation, a cut-in analysis, and/or a merge operation to ensure the safety of the vehicle 102 and cyclists in the bike lane 108, as described above. Furthermore, in at least one example, the system(s) can perform an operation for safely completing a turn from a lane that is not supposed to be turned from. That is, in the example provided in FIG. 5, if the vehicle 102 cannot merge into the bike lane 108, it may complete the right turn from the driving lane 106 and cross the bike lane 108 (e.g., the vehicle 102 is supposed to turn from the bike lane 108 and not the driving lane 106). In such an example, the system(s) can control the vehicle 102 to yield to objects in the proper turn lane and to release (e.g., the yield) when it is safe to complete the turn (e.g., when the objects have cleared). That is, while illustrated as a particular abort action in FIG. 5, the vehicle 102 can still adhere to rules of permissibility as they pertain to driving in the environment 100.

In the example abort action described in FIG. 5, the driving corridor (e.g., as described above with reference to FIG. 3) can again be dynamically modified to limit the lateral movement of the vehicle 102. For example, the system(s) of the vehicle 102 can expand the right side of the driving corridor to the bike lane 108 at or near the beginning 114 of the merging zone 112. In such an example, the offset can be drawn in towards the vehicle 102 based on the lateral bias. In some examples, the left boundary can be drawn in towards the vehicle 102. That is, the driving corridor can be reduced to a width of the vehicle 102, plus a predetermined margin on each side of the vehicle 102. By narrowing the driving corridor, sudden lateral motion can be restricted to avoid the vehicle 102 from accidently establishing itself into the bike lane 108.

While FIGS. 1-5 illustrate an example where the vehicle 102 is performing a right turn from the bike lane 108, in additional or alternative examples, the vehicle 102 can perform a left turn from a bike lane (e.g., in an example of a one-way) by implementing techniques as described herein. Moreover, in at least one example, the vehicle 102 can perform a turn from a parking lane, a bus lane, or other designated lane using techniques described herein. Further, in additional or alternative examples, the vehicle 102 can perform a left turn or a right turn from a left turning lane or a right turning lane by implementing techniques described herein. That said, in an example where the vehicle 102 performs a left turn from a left turning lane or a right turn from a right turning lane, the vehicle 102 can modify its reference from the driving lane 106 to the second lane but may not need to perform the subsequent modification to the reference. That is, once the vehicle 102 has performed a lane change, the vehicle 102 may not need to readjust its reference for the purpose of the turn (e.g., can execute in-lane driving).

Figure 6:
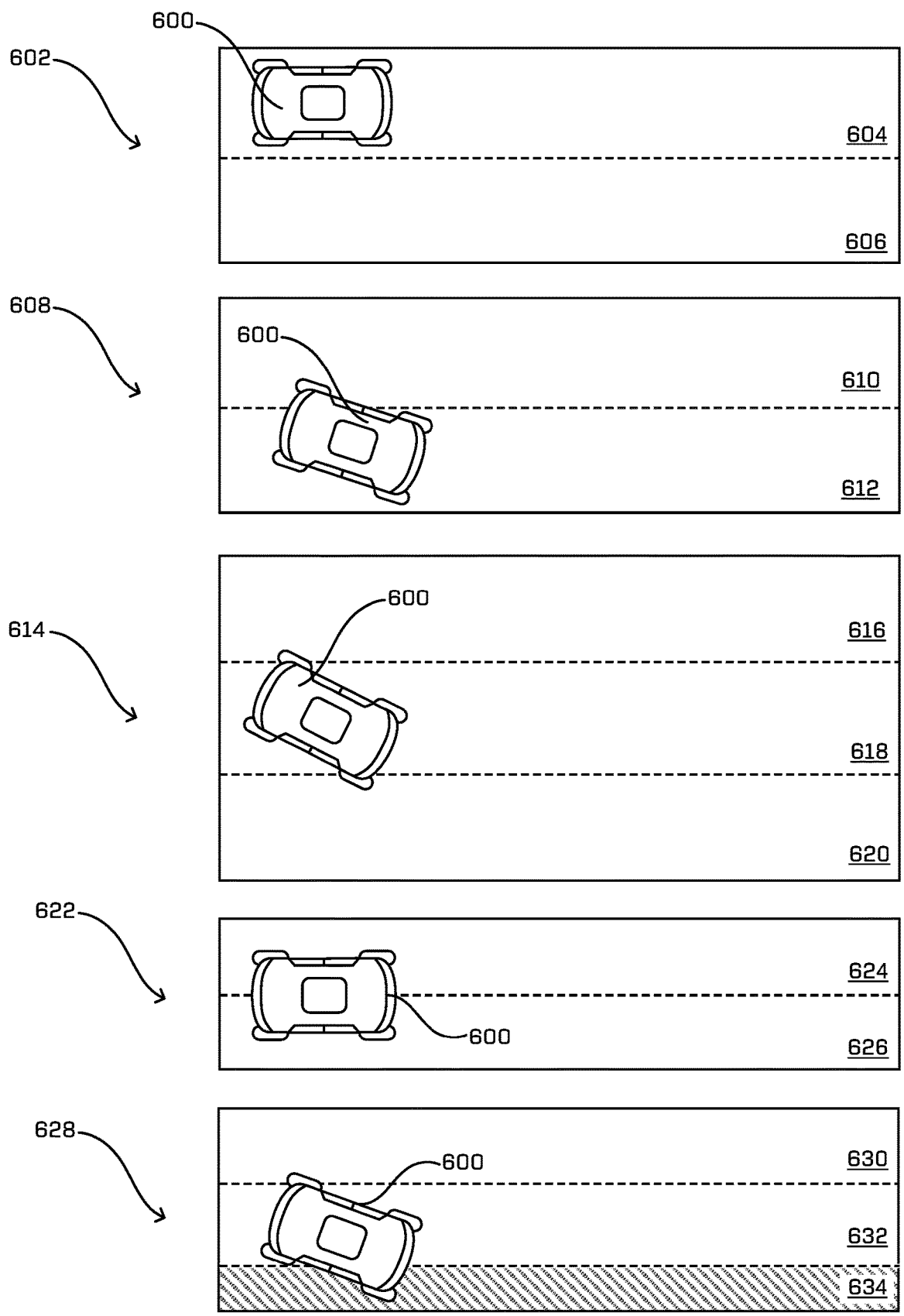
FIG. 6 illustrates examples of classifying a vehicle based at least in part on a signal indicative of a presence of the vehicle in a lane, as described herein.

FIG. 6 illustrates examples of classifying a vehicle based at least in part on a signal indicative of a presence of the vehicle in the lane, as described herein. In at least one example, the system(s) of a vehicle, such as vehicle 600, can determine classifications for lanes. As described above, such a classification can indicate a state of the vehicle 600 relative to a particular lane. Such classifications can be useful for lane handling. The vehicle 600 can correspond to the vehicle 102 described above.

In at least one example, the system(s) of the vehicle 600 can determine a signal indicative of the presence of the vehicle 600 in one or more lanes of an environment of the vehicle 600. In at least one example, a signal can be based on one or more of a position of a component of the vehicle 600 (e.g., the front bumper), a dimension of a bounding box (or other indicator) associated with the vehicle 600 relative to a lane reference of the lane, an area of the bounding box associated with the vehicle, a ratio of a width of the lane that is occupied by the vehicle 600 to the width of the lane that is unoccupied, and the like. For instance, the system(s) can store the width and/or fraction of the front bumper of the vehicle 600 that occupies multiple lanes and can check the position of the front bumper of the vehicle 600. If the front bumper spans into multiple lanes, the system(s) can determine a width that the front bumper penetrates into each lane and a fraction of the front bumper in each lane.

Furthermore, in some examples, the system(s) can identify and/or classify objects within the environment of the vehicle 600. In such examples, the system(s) can output bounding boxes associated objects identified in the environment of the vehicle 600. In at least one example, the system(s) can store width and/or fraction data associated with a bounding box of the vehicle 600, which can be based on the span of the bounding box (e.g., perpendicular to the lane reference). In some examples, the bounding box can occupy multiple lanes. In such examples, the system(s) can determine a width of the bounding box as penetrated into each lane and a fraction of the span of the bounding box in each lane. Furthermore, in at least one example, the system(s) can store the amount of bounding box area of the vehicle 600 in each lane.

In at least one example, the system(s) can determine occupied/unoccupied lane space. For instance, the system(s) can store the amount of each lane that is occupied by the vehicle 600. The system(s) can leverage the width calculations described above to determine what portion of each lane the vehicle 600 occupies or leaves unoccupied. As non-limiting examples, the system(s) can determine total unoccupied lane space, total unoccupied fraction, occupied fraction, individual unoccupied section(s), individual unoccupied section(s) fraction, etc.

Based at least in part on the signal determined for a lane, the system(s) can classify individual lanes as an established lane, an occupied lane, and/or an unoccupied lane. In at least one example, the system(s) can determine, using the signal, whether any portion of the vehicle 600 occupies a lane. If a portion of the vehicle 600 occupies the lane, the lane can be associated with an occupied classification. That is, the vehicle 600 can occupy the lane. If no portion of the vehicle 600 occupies the lane, the lane can be associated with an unoccupied classification.

In at least one example, the system(s) can determine, using the signal, whether a portion of the vehicle 600 that occupies a lane meets or exceeds a threshold. If the portion of the vehicle 600 that occupies the lane meets or exceeds the threshold, the system(s) can determine that the lane is established by the vehicle 600 (as well as occupied). When the vehicle 600 is established in a lane (e.g., the lane is associated with an established classification), the vehicle 600 can have established priority and/or right-of-way in that lane. If the portion of the vehicle 600 that occupies the lane does not meet or exceed (e.g., is less than) the threshold, the system(s) can determine that the lane is occupied by the vehicle 600 (but not established).

In some examples, a portion of the vehicle 600 that occupies the lane may not meet or exceed the threshold. However, in some examples, a vehicle 600 can still be determined to be established in the lane based on an unoccupied portion of the lane. For instance, the system(s) can determine whether an unoccupied portion of a lane does not meet or exceed (e.g., is less than) a threshold (e.g., indicating there is not passing distance in the lane). If the unoccupied portion of a lane does not meet or exceed (e.g., is less than) a threshold, the system(s) can determine that the lane is classified as an established lane. However, if the unoccupied portion of the lane meets or exceeds the threshold, the system(s) can determine that the lane is classified as either occupied or unoccupied.

In some examples, the system(s) can use the lateral velocity of the vehicle 600 to determine whether to classify a lane as established, occupied, or unoccupied. For example, if the lateral velocity of the vehicle 600 meets or exceeds a threshold, a lane can be determined to be classified as an established lane sooner than if the lateral velocity of the vehicle 600 does not meet or exceed (e.g., is less than) the threshold. In such examples, such a velocity may be related to an intention of the object to enter a particular lane.

In the first example 602 in FIG. 6, the vehicle 600 is established in a first lane 604 and a second lane 606 is unoccupied. That is, the portion of the vehicle 600 that occupies the first lane 604 meets or exceeds a threshold. As such, the vehicle 600 is established in the first lane 604. That is, the first lane 604 can be classified as an established lane. Additionally, because the vehicle 600 occupies at least a portion of the first lane 604, the first lane 604 can also be classified as an occupied lane. Because the second lane 606 is unoccupied, the second lane 606 can be classified as such: unoccupied.

In the second example 608, the vehicle 600 occupies at least a portion of both a first lane 610 and a second lane 612. As such, both lanes can be classified as occupied lanes. However, the portion of the vehicle 600 that occupies the second lane 612 is more than a threshold, so the second lane 612 can additionally be classified as an established lane. That is, the vehicle 600 is established in the second lane 612.

In the third example 614, a portion of the vehicle 600 that occupies the first lane 616, the second lane 618, and the third lane 620. As such, each lane is classified as an occupied lane. However, the portion of the vehicle 600 that occupies the second lane 618 meets or exceeds a threshold, so the second lane 618 can additionally be classified as the established lane. That is, the vehicle 600 is established in the second lane 618.

In the fourth example 622, a portion of the vehicle 600 occupies at the first lane 624 and the second lane 626. As such, each lane is classified as an occupied lane. However, the portion of the vehicle 600 that occupies the first lane 624 and the second lane 626 does not occupy more than a threshold of either the first lane 624 or the second lane 626. As such, the vehicle 600 is not established in either lane. As such, neither lane is classified as an established lane.

In the fifth example 628, a portion of the vehicle 600 occupies the first lane 630, the second lane 632, and the third lane 634, which is a bike lane. As such, each lane is classified as an occupied lane. However, the portion of the vehicle 600 that occupies the second lane 632 meets or exceeds a threshold, so the second lane 632 can additionally be classified as the established lane. That is, the vehicle 600 is established in the second lane 632. Additionally, because the amount of unoccupied space in the third lane 634 does not meet or exceed (e.g., is less than) a threshold, the vehicle 600 can additionally be established in the third lane 634 (even though the portion of the vehicle 600 that occupies the third lane 634 does not meet or exceed the threshold for determining that the vehicle 600 is established in the third lane 634).

Figure 8:
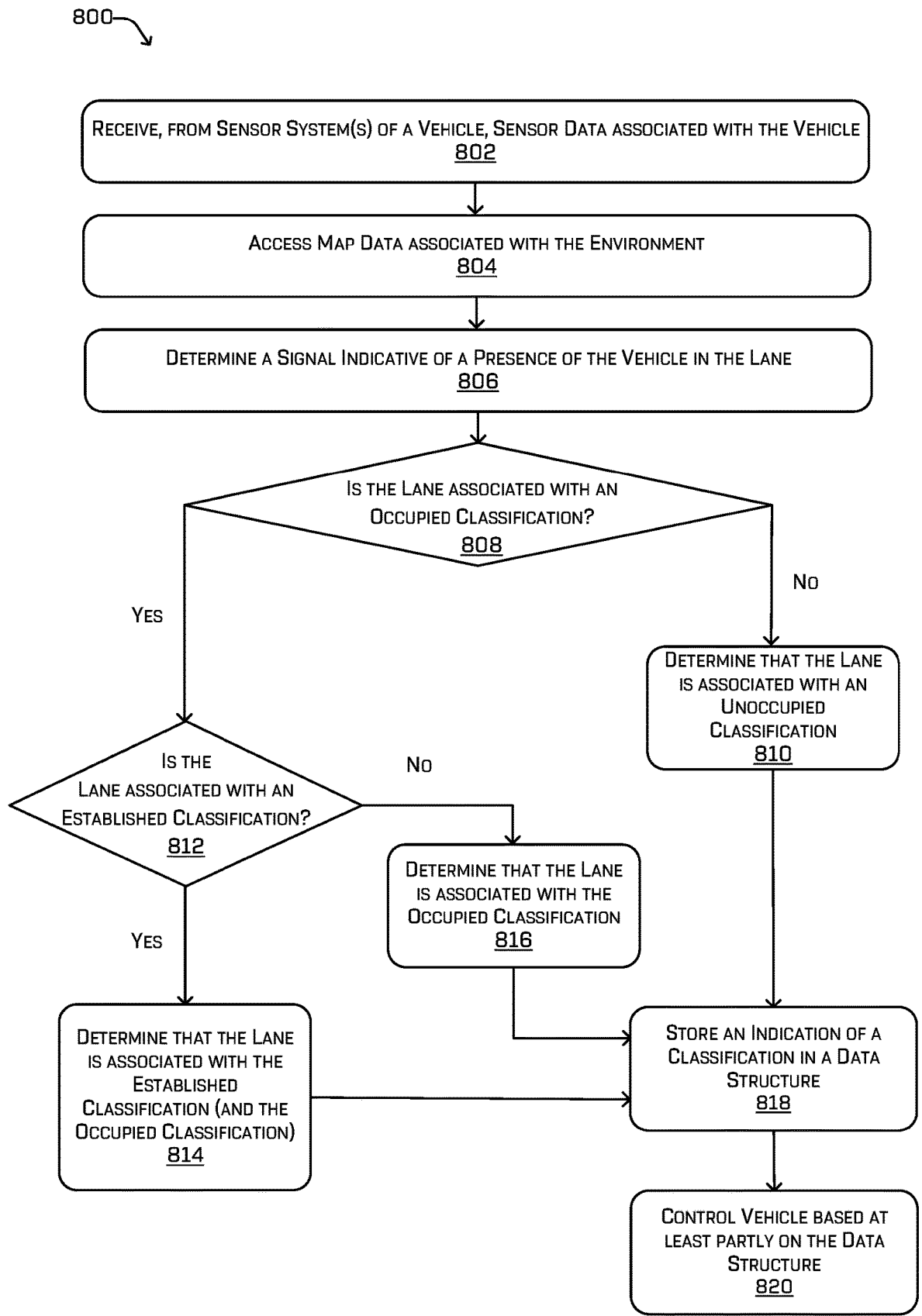
FIG. 8 illustrates an example process for determining a classification of a vehicle based at least in part on a signal indicative of a presence of the vehicle in a lane, as described herein.
Figure 9:
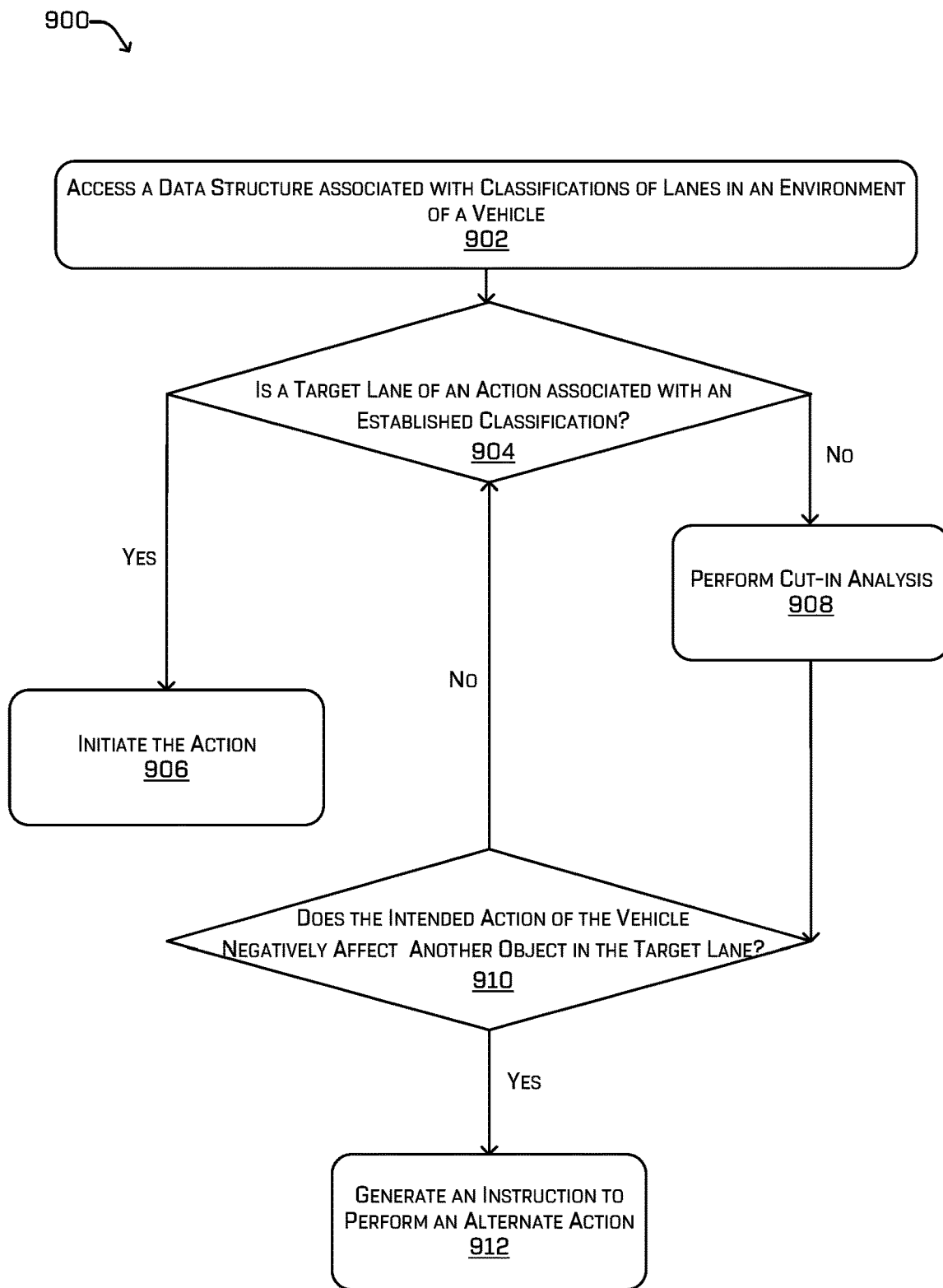
FIG. 9 illustrates an example process for using a classification of a vehicle for performing lane handling techniques, as described herein.

Classifications, such as those described above, can be used by the vehicle 600 in controlling the vehicle 600, for example when merging from a parking lane to a driving lane (e.g., when the vehicle 600 is established in the driving lane, the vehicle 600 can cease to perform a cut-in analysis or other analyses that enable the vehicle 600 to merge into the driving lane), merging from a driving lane to a turning lane (e.g., when the vehicle 600 is established in the turning lane, the vehicle 600 can cease to perform a cut-in analysis or other analyses that enable the vehicle 600 to merge into the turning lane), merging from a driving lane to a bike lane (e.g., when the vehicle 600 is established in the bike lane, the vehicle 600 can cease to perform a cut-in analysis or other analyses that enable the vehicle 600 to merge into the bike lane), and/or performing other lane handling operations as described herein. FIGS. 8-9 below describe additional details associated with determining a signal indicative of a presence of the autonomous vehicle in the lane and using classifications of lanes for lane handling techniques as described herein.

Figure 7:
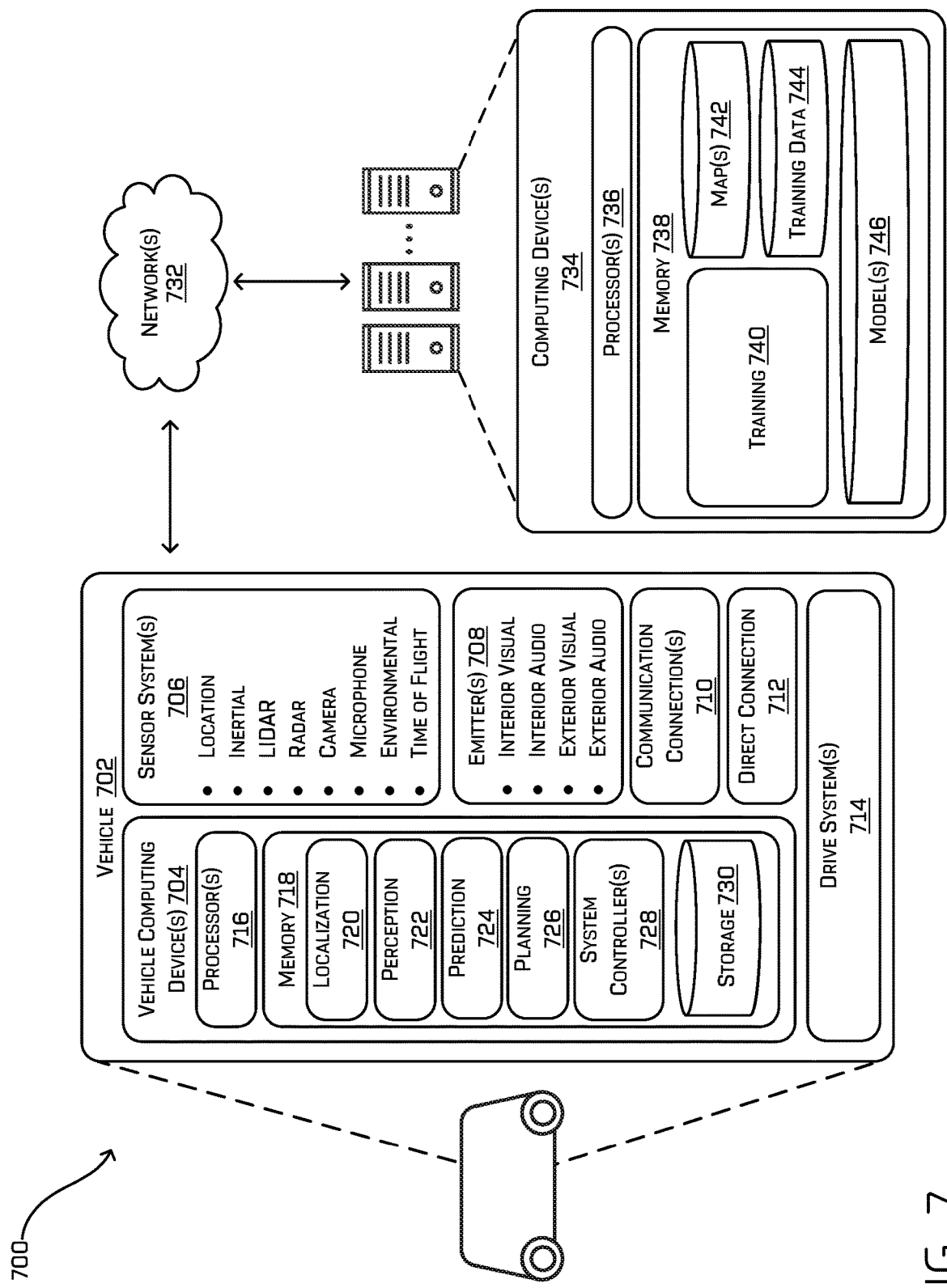
FIG. 7 is a block diagram illustrating an example system for performing techniques, as described herein.

FIG. 7 is a block diagram illustrating an example system 700 for performing techniques, as described herein. In at least one example, a vehicle 702 (which can correspond to the vehicle 102 and/or the vehicle 600) can include one or more vehicle computing devices 704, one or more sensor systems 706, one or more emitters 708, one or more communication connections 710, at least one direct connection 712, and one or more drive systems 714. As described above, the vehicle 702 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 702 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 702 is an autonomous vehicle; however, the vehicle 702 could be any other type of vehicle.

The vehicle computing device(s) 704 can include processor(s) 716 and memory 718 communicatively coupled with the processor(s) 716. In the illustrated example, the memory 718 of the vehicle computing device(s) 704 stores a localization system 720, a perception system 722, a prediction system 724, a planning system 726, and one or more system controllers 728. Additionally, the memory 718 can include a storage 730, which can store map(s), model(s), signal data (e.g., indicating a presence of a vehicle in a lane (or not)), lane classifications, etc. As described above, a map can be any number of data structures that are capable of providing information about an environment, such as, but not limited to, topologies (such as junctions, lanes, merging zones, etc.), streets, mountain ranges, roads, terrain, and the environment in general. Maps can be associated with real environments or simulated environments. Model(s) can include machine-trained models, as described below. Signal data and lane classifications are described above with reference to FIG. 6.

In at least one example, the localization system 720 can determine a pose (position and orientation) of the vehicle 702 in relation to a local and/or global map based at least in part on sensor data received from the sensor system(s) 706 and/or map data associated with a map (e.g., of the map(s)). In at least one example, the localization system 720 can include, or be associated with a calibration system that is capable of performing operations for calibrating (determining various intrinsic and extrinsic parameters associated with any one or more of the sensor system(s) 706), localizing, and mapping substantially simultaneously. Additional details associated with such a system are described in U.S. patent application Ser. No. 15/675,487, filed on Aug. 11, 2017, now known as U.S. Patent Publication No. 2019/0049242, which is related to U.S. patent application Ser. No. 15/674,853, filed on Aug. 11, 2017, now known as U.S. Patent Publication No. 2019/0049566, the entire contents of both of which are incorporated by reference herein.

In at least one example, the perception system 722 can perform object detection, segmentation, and/or classification based at least in part on sensor data received from the sensor system(s) 706. In at least one example, the perception system 722 can receive raw sensor data (e.g., from the sensor system(s) 706). In at least one example, the perception system 722 can receive image data and can utilize one or more image processing algorithms to perform object detection, segmentation, and/or classification with respect to object(s) identified in the image data. In some examples, the perception system 722 can associate a bounding box (or otherwise an instance segmentation) with an identified object and can associate a confidence score associated with a classification of the identified object with the identified object. In some examples, objects, when rendered via a display, can be colored based on their perceived class. The perception system 722 can perform similar processes for one or more other modalities (e.g., LIDAR, RADAR, ToF systems, etc.).

The prediction system 724 can access sensor data from the sensor system(s) 706, map data associated with a map (e.g., of the map(s) which can be in storage 730), and/or perception data output from the perception system 722 (e.g., processed sensor data), and can output predictions associated with one or more objects within the environment of the vehicle 702. In at least one example, the planning system 726 can determine routes and/or trajectories to use to control the vehicle 702 based at least in part on sensor data received from the sensor system(s) 706 and/or any determinations made by the perception system 722 and/or prediction system 724. In at least one example, the planning system 726 can perform the lane classifying techniques described herein. Furthermore, the planning system 726 can perform the lane handling techniques described herein.

Additional details of localization systems, perception systems, prediction systems, and/or planning systems that are usable can be found in U.S. Pat. No. 9,612,123, issued on Apr. 4, 2017, and U.S. Pat. No. 10,353,390, issued on Jul. 16, 2019, the entire contents of both of which are incorporated by reference herein. In some examples (e.g., where the vehicle 702 is not an autonomous vehicle), one or more of the aforementioned systems can be omitted from the vehicle 702. While the systems described above are illustrated as "onboard" the vehicle 702, in other implementations, the systems can be remotely located and/or accessible to the vehicle 702. Furthermore, while the systems are described above as "systems," such systems can comprise one or more components for performing operations attributed to each of the systems. In at least one example, the "system(s)" described above with reference to FIGS. 1-6 can comprise one or more of the localization system 720, the perception system 722, the prediction system 724, and/or the planning system 726 described herein with reference to FIG. 7.

In at least one example, the localization system 720, the perception system 722, the prediction system 724, and/or the planning system 726 can process sensor data, as described above, and can send their respective outputs over network(s) 732, to computing device(s) 734. In at least one example, the localization system 720, the perception system 722, the prediction system 724, and/or the planning system 726 can send their respective outputs to the computing device(s) 734 at a particular frequency, after a lapse of a predetermined period of time, in near real-time, etc.

In at least one example, the vehicle computing device(s) 704 can include one or more system controllers 728, which can be configured to control steering, propulsion, braking, safety, emitters, communication, and other systems of the vehicle 702. These system controller(s) 728 can communicate with and/or control corresponding systems of the drive system(s) 714 and/or other systems of the vehicle 702.

In at least one example, the sensor system(s) 706 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), ToF sensors, etc. The sensor system(s) 706 can include multiple instances of each of these or other types of sensors. For instance, the LIDAR sensors can include individual LIDAR sensors located at the corners, front, back, sides, and/or top of the vehicle 702. As another example, the camera sensors can include multiple cameras positioned at various locations about the exterior and/or interior of the vehicle 702. The sensor system(s) 706 can provide input to the vehicle computing device(s) 704. In some examples, the sensor system(s) 706 can preprocess at least some of the sensor data prior to sending the sensor data to the vehicle computing device(s) 704. In at least one example, the sensor system(s) 706 can send sensor data, via the network(s) 732, to the computing device(s) 734 at a particular frequency, after a lapse of a predetermined period of time, in near real-time, etc.

The vehicle 702 can also include one or more emitters 708 for emitting light and/or sound, as described above. The emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 708 can be positioned at various locations about the exterior and/or interior of the vehicle 702.

The vehicle 702 can also include communication connection(s) 710 that enable communication between the vehicle 702 and other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 732. For example, the communications connection(s) 710 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 712 can directly connect the drive system(s) 714 and other systems of the vehicle 702.

In at least one example, the vehicle 702 can include drive system(s) 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include sensor system(s) to detect conditions of the drive system(s) 714 and/or the surroundings of the vehicle 702. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, LIDAR sensors, RADAR sensors, etc. Some sensors, such as the wheel encoder(s), can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle 702, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 714. Furthermore, the drive system(s) 714 also include communication connection(s) that enable communication by the respective drive module with other local or remote computing device(s).

In FIG. 7, the vehicle computing device(s) 704, sensor system(s) 706, emitter(s) 708, and the communication connection(s) 710 are shown onboard the vehicle 702. However, in some examples, the vehicle computing device(s) 704, sensor system(s) 706, emitter(s) 708, and the communication connection(s) 710 can be implemented outside of an actual vehicle (i.e., not onboard the vehicle 702).

As described above, the vehicle 702 can send sensor data to the computing device(s) 734, via the network(s) 732. In some examples, the vehicle 702 can send raw sensor data to the computing device(s) 734. In other examples, the vehicle 702 can send processed sensor data and/or representations of sensor data to the computing device(s) 734 (e.g., data output from the localization system 720, the perception system 722, the prediction system 724, and/or the planning system 726). In some examples, the vehicle 702 can send sensor data to the computing device(s) 734 at a particular frequency, after a lapse of a predetermined period of time, in near real-time, etc.

The computing device(s) 734 can receive the sensor data (raw or processed) from the vehicle 702 and/or other data collection devices (which can include other vehicles like 702), as well as data from one or more third party sources and/or systems. In at least one example, the computing device(s) 734 can include processor(s) 736 and memory 738 communicatively coupled with the processor(s) 736. In the illustrated example, the memory 738 of the computing device(s) 734 stores a training system 740, a map(s) storage 742 (e.g., storing one or more maps), a training data storage 744 (e.g., storing training data accessible to the training system 740), and a model(s) storage 746 (e.g., models output by the training system 740). In some examples, one or more of the systems and/or storage repositories can be associated with the vehicle 702 instead of, or in addition to, being associated with the memory 738 of the computing device(s) 734.

In at least one example, the training system 740 can train data model(s), which can be used for various operations as described herein. For example, machine learning algorithms for training machine learned model(s) can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), example-based algorithms (e.g., ridge regression, least absolute shrinkage and selection operator (LASSO), elastic net, least-angle regression (LARS)), decisions tree algorithms (e.g., classification and regression tree (CART), iterative dichotomiser 7 (ID7), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), other Deep Belief Networks (DBN), Artificial Neural Network (ANN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), SVM (support vector machine), supervised learning, unsupervised learning, semi-supervised learning, etc.

In at least one example, the training system 740 can train a classifier to classify lanes based at least in part on a signal indicative of a presence of a vehicle in a lane. For example, the training system 740 can receive training data indicative of classified lanes and associated signals. The training system 740 can utilize one or more machine learning algorithms to train one or more models to output one or more classifications based at least in part on a signal. As a result, machine learned models can receive a signal associated with a lane, as described above, and can output one or more classifications for a particular lane.

The resulting data model(s) can be stored in the model(s) storage 746 and/or the storage 730 on the vehicle 702 and can be accessed by the perception system 722 for detecting and/or classifying objects.

The processor(s) 716 of the vehicle 702 and the processor(s) 736 of the computing device(s) 734 can be any suitable processor capable of executing instructions to process data and perform operations as described herein. By way of example and not limitation, the processor(s) 716 and 736 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 738 are examples of non-transitory computer-readable media. Memory 718 and 738 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, systems of the vehicle 702 can be associated with the computing device(s) 734 and/or systems of the computing device(s) 734 can be associated with the vehicle 702. That is, the vehicle 702 can perform one or more of the functions associated with the computing device(s) 734, and vice versa.

FIGS. 8-11 are flowcharts showing example methods involving techniques as described herein. The methods illustrated in FIGS. 8-11 are described with reference to the system 700 shown in FIG. 7 for convenience and ease of understanding. However, the methods illustrated in FIGS. 8-11 are not limited to being performed using the system 700. Moreover, the system 700 described herein is not limited to performing the methods illustrated in FIGS. 8-11.

The methods 800-1100 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods 800-1100 can be combined in whole or in part with each other or with other methods.

FIG. 8 illustrates an example process 800 for determining a classification of a vehicle based at least in part on a signal indicative of a presence of the vehicle in a lane, as described herein.

Block 802 illustrates receiving, from sensor system(s) of a vehicle, sensor data associated with the vehicle. As described above, in at least one example, the vehicle 702 can be associated with sensor system(s) 706, In at least one example, the sensor system(s) 706 can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), ToF sensors, etc. In at least one example, the sensor system(s) 706 can generate sensor data associated with the environment within which the vehicle 702 is positioned.

Block 804 illustrates accessing map data associated with the environment. As described above, the vehicle 702 can include storage 730, which can store map(s). In at least one example, the localization system 720 can access the map(s) (and sensor data) for determining a pose (position and orientation) of the vehicle 702 in relation to a local and/or global map based at least in part on sensor data received from the sensor system(s) 706 and/or map data associated with a map (e.g., of the map(s)). In at least one example, the vehicle 702 can be determined to be associated with a lane in the environment.

Block 806 illustrates determining a signal indicative of a presence of the vehicle in the lane. In at least one example, the planning system 726 of the vehicle 702 can determine signals of lanes in an environment of the vehicle 702. In some examples, a signal can be determined based at least in part on the sensor data and/or the map data. As described above with reference to FIG. 6, in at least one example, the signal can be based on one or more of a position of a component of the vehicle 702 (e.g., the front bumper), a dimension of a bounding box (or other indicator) associated with the vehicle 702 relative to a lane reference of the lane, an area of the bounding box associated with the vehicle 702, a ratio of a width of the lane that is occupied by the vehicle 702 to the width of the lane that is unoccupied (e.g., fractional data), and the like.

Block 808 illustrates determining whether the lane is associated with an occupied classification. Based at least in part on the signal determined for the lane, the planning system 726 can classify individual lanes as an established lane, an occupied lane, and/or an unoccupied lane. In at least one example, the planning system can determine, using the signal, whether any portion of the vehicle 702 occupies a lane. If a portion of the vehicle 702 occupies the lane, the lane can be associated with an occupied classification. If no portion of the vehicle 702 occupies the lane, the lane can be associated with an unoccupied classification, as illustrated in block 810.

Block 812 illustrates determining whether the lane is associated with an established classification. In at least one example, based at least in part on determining that the lane is associated with an occupied classification, the planning system 726 can determine whether the lane is also associated with an established classification. In at least one example, the planning system 726 can determine, using the signal, whether a portion of the vehicle 702 that occupies the lane meets or exceeds a threshold. If the portion of the vehicle 702 that occupies the lane meets or exceeds the threshold, the planning system 726 can determine that the lane is established by the vehicle 702. That is, the planning system 726 can associate an established classification with the lane (as well as the occupied classification), as illustrated in block 814.

If the portion of the vehicle 702 that occupies the lane does not meet or exceed (e.g., is less than) the threshold, the planning system 726 can determine whether an unoccupied portion of a lane does not meet or exceed (e.g., is less than) a threshold (e.g., indicating there is not enough space for passing). If the unoccupied portion of a lane does not meet or exceed (e.g., is less than) a threshold, the planning system 726 can determine that the lane is classified as an established lane, even though the portion of the vehicle 702 that occupies the lane does not meet the threshold for determining that the vehicle 702 is established.

In some examples, the planning system 726 can use the lateral velocity of the vehicle 702 to determine whether to classify a lane as established, occupied, or unoccupied. For example, if the lateral velocity of the vehicle 702 meets or exceeds a threshold, a lane can be determined to be classified as an established lane sooner than if the lateral velocity of the vehicle 702 does not meet or exceed (e.g., is less than) the threshold.

If the lane is associated with an occupied classification (e.g., as described above with reference to block 808) but is not associated with an established classification (e.g., as described above with reference to 812), the planning system 726 can determine that the lane is associated with an occupied classification (and not an established classification), as illustrated in block 816.

Block 818 illustrates storing an indication of the classification in a data structure. In at least one example, an indication of the classification (e.g., established, occupied, or unoccupied) can be stored in an a data structure, with indications of classifications of one or more other lanes that are within the environment of the vehicle 702. The data structure can store information associated with lanes in an environment that are proximate to a current position of the vehicle 702. For example, the data structure can store indications of classifications of the lane where the vehicle 702 is currently positioned and some number (e.g., one, two, three, etc.) lanes on each side of the current lane (e.g., to the left, to the right, etc.).

Block 820 illustrates controlling the vehicle based at least partly on the data structure. In at least one example, the system(s) of the vehicle 702 can access the data structure to determine how to control the vehicle 702. For instance, in at least one example, actions (e.g., merging into a bike lane, turning lane, etc., changing lanes, merging into a driving lane from a parking lane, navigating around blockage (e.g., another object, etc.) in the environment, etc.) that target a lane where the vehicle 702 is established (e.g., the lane is associated with an established classification), the vehicle 702 can have priority and/or the right-of-way with respect to the lane. As such, in at least one example, the planning system 726 need not consider a cut-in constraint (e.g., need not perform a cut-in analysis). However, for actions that target a lane where the vehicle 702 is not established (e.g., the lane is associated with an occupied or unoccupied classification), the planning system 726 can consider the cut-in constraint (e.g., perform a cut-in analysis). Additional details are described below with reference to FIG. 9.

FIG. 9 illustrates an example process 900 for using a classification of a vehicle for performing lane handling techniques, as described herein.

Block 902 illustrates accessing a data structure associated with classifications of lanes in an environment of a vehicle. In at least one example, the planning system 726 can access the data structure described in block 818 above.

Block 904 illustrates determining whether a target lane of an action is associated with an established classification. In at least one example, the planning system 726 can identify a target lane associated with an action for controlling the vehicle 702 and can perform a look-up or other search to determine the classification associated with the target lane. In at least one example, such an action can be a lane change, a merge into another lane, a merge into a driving lane from a parking lane, a maneuver around blockage (e.g., another object) into an oncoming lane, or another lane handling action. If the target lane is associated with an established classification, the planning system 726 need not perform a cut-in analysis in association with an action for controlling the vehicle 702 (e.g., need not perform a cut-in analysis). That is, the planning system 726 can communicate with other system(s) of the vehicle 702 to perform the action, as illustrated in block 906.

However, if the target lane is associated with an occupied classification or unoccupied classification, the planning system 726 can perform the cut-in analysis in association with the action (e.g., perform a cut-in analysis), as illustrated in block 908. That is, the planning system 726 can determine whether another object is in the target lane and/or whether the vehicle's intended action is predicted to negatively affect the other object. That is, the planning system 726 can perform a cut-in analysis to determine whether it is safe for the vehicle 702 to merge into the target lane (e.g., free of collision and/or uncomfortable braking for the other object). As a non-limiting example of discomfort, despite being able to enter the lane, merging may cause the other object to come within a threshold distance of the vehicle and/or decelerate at rate which is uncomfortable for the occupants therein.

Block 910 illustrates determining whether the intended action of the vehicle negatively affects another object in the target lane. In at least one example, if the cut-in analysis determines a conflict, for instance, that there is another object in the target lane and the intended action of the vehicle 702 is predicted to negatively affect the other object (e.g., cause a collision, cause uncomfortable braking, etc.), the planning system 726 may opt for an alternate action (e.g., an abort action). In such an example, the planning system 726 can generate an alternate action. If an alternate action has been generated, the planning system 726 can generate an instruction to perform the alternate action, as illustrated in block 912. In at least one example, responsive to determining that the vehicle 702 merging into the second lane is predicted to negatively affect another object in the second lane, the planning system 726 can generate an instruction for performing an abort action to prevent the vehicle 702 from merging into the second lane, at least temporarily.

However, if an alternate action has not been generated, the planning system 726 can return to block 904 to determine whether the target lane of the action is associated with an established classification. That is, in some examples, the planning system 726 can perform the action after having performed the cut-in analysis. For example, based at least in part on performing the cut-in analysis, the planning system 726 can check again whether the target lane is associated with an established classification (e.g., (i) whether the portion of the vehicle 702 that occupies the target lane meets or exceeds a threshold portion and/or (ii) whether an unoccupied portion of the target lane is below a (different) threshold). Based at least in part on determining that the target lane is associated with an established classification, the planning system 726 can determine that the vehicle 702 can perform the action. As such, the planning system 726 can initiate the action, as illustrated in block 906. In some examples, the cut-in analysis can be performed by the planning system 726 until the vehicle 702 is established in the target lane, at which point, the planning system 726 can terminate the cut-in analysis.

Figure 10:
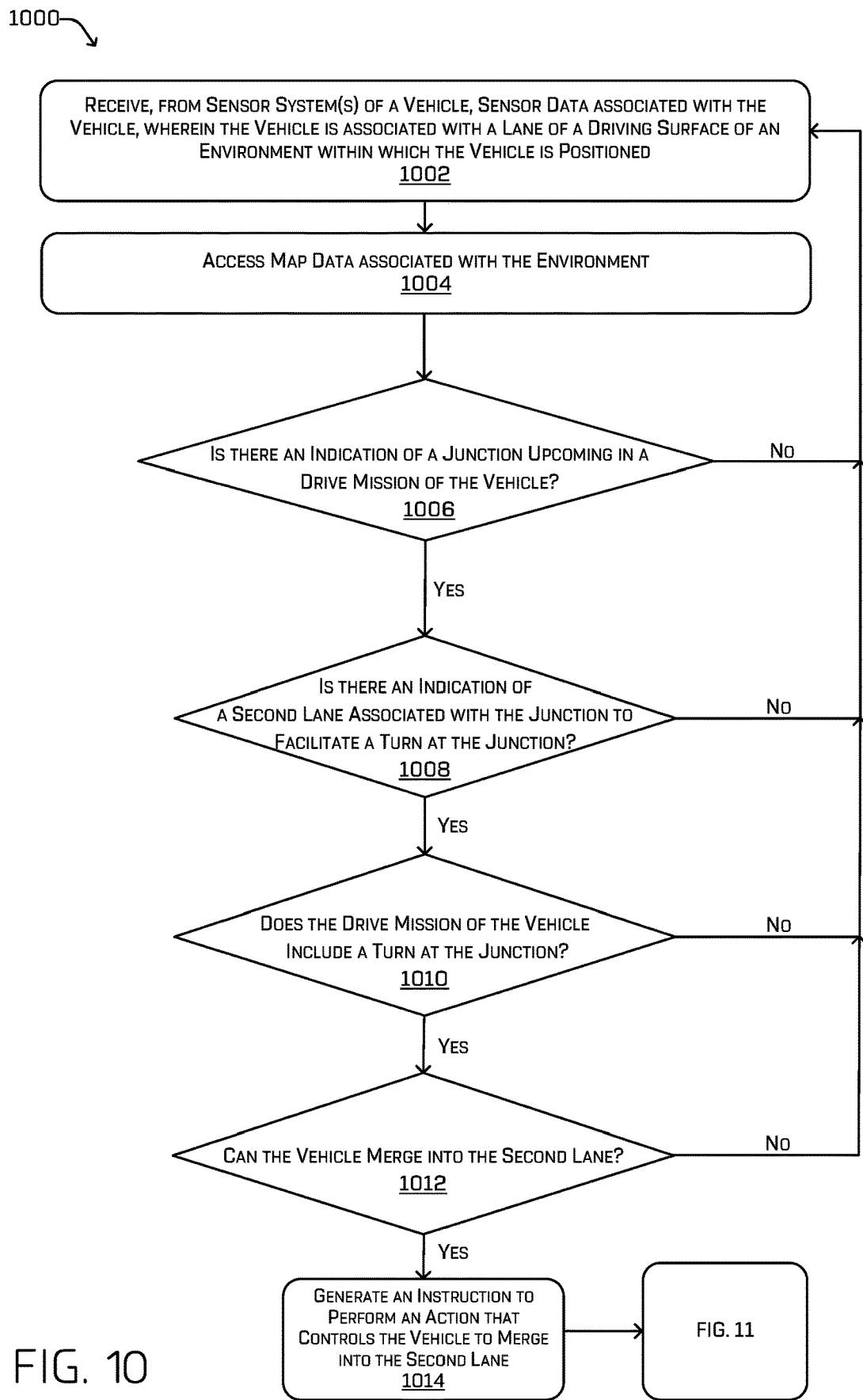
FIG. 10 illustrates an example process for performing lane handling techniques, as described herein.

FIG. 10 illustrates an example process 1000 for performing lane handling techniques, as described herein.

Block 1002 illustrates receiving, from sensor system(s) of a vehicle, sensor data associated with the vehicle, wherein the vehicle is associated with a lane of a driving surface of an environment within which the vehicle is positioned. As described above, in at least one example, the vehicle 702 can be associated with sensor system(s) 706, which can include LIDAR sensors, RADAR sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), wheel encoders, microphones, environment sensors (e.g., temperature sensors, humidity sensors, light sensors, pressure sensors, etc.), ToF sensors, etc. In at least one example, the sensor system(s) 706 can generate sensor data associated with the environment within which the vehicle 702 is positioned.

Block 1004 illustrates accessing map data associated with the environment. As described above, the vehicle 702 can include storage 730, which can store map(s). In at least one example, the localization system 720 can access the map(s) (and sensor data) for determining a pose (position and orientation) of the vehicle 702 in relation to a local and/or global map based at least in part on sensor data received from the sensor system(s) 706 and/or map data associated with a map (e.g., of the map(s)). In at least one example, the vehicle 702 can be determined to be associated with a lane in the environment.

Block 1006 illustrates determining whether there is an indication of a junction upcoming in a drive mission of the vehicle. In at least one example, the planning system 726 can utilize map data associated with map(s), as described above, and/or sensor data received from the sensor system(s) 706 and can generate a drive mission for the vehicle 702 (which can be based at least in part on a target destination). The drive mission can comprise a plurality of trajectories along which the vehicle 702 is to follow to drive along a route. The planning system 726 can scan ahead for the nearest junction in the scanning horizon. That is, the planning system 726 can analyze the map data and/or sensor data to determine whether there is an indication of a junction in a drive mission of the vehicle 702.

Block 1008 illustrates determining whether there is an indication of a second lane associated with the junction to facilitate a turn at the junction. In at least one example, the planning system 726 can analyze the map data and/or the sensor data to determine whether there is a second lane associated with the junction, such as a right turn lane, a left turn lane, or a bike lane. In at least one example, the planning system 726 can scan ahead for an indication that is disposed between the vehicle 702 and the junction. If there is neither a junction nor a second lane, the vehicle 702 can continue on the drive mission, and process 1000 can return to block 1002. Further, if there is a junction, but no second lane, the vehicle 702 can continue on the drive mission, and the process 1000 can return to block 1002.

Block 1010 illustrates determining whether the drive mission of the vehicle includes a turn at the junction. In at least one example, the planning system 726 can determine whether the drive mission of the vehicle 702 includes a turn at the junction. If the drive mission does not include a turn at the junction, the vehicle 702 can continue the drive mission of the vehicle 702, and the process 1000 can return to block 1002.

Block 1012 illustrates determining whether the vehicle can merge into the second lane. In at least one example, the planning system 726 can determine, based at least in part on the sensor data and/or the map data, whether the vehicle 702 can merge into the second lane given the conditions of the environment (e.g., is there a valid action trajectory, no blockage, etc.). So long as the vehicle 702 can merge into the second lane, the planning system 726 can generate an instruction to perform an action that controls the vehicle 702 to merge into the second lane prior to executing the turn, as illustrated in block 1012, and the process 1000 can continue to FIG. 11. However, if the vehicle 702 cannot merge into the second lane, the process 1000 can return to block 1002.

In at least one example, block 1006-1012 can be considered preconditions such that if any one of the preconditions fails, the vehicle 702 can refrain from merging into the second lane and executing a turn at the junction.

Block 1014 illustrates generating an instruction to perform an action that controls the vehicle to merge into the second lane. Based at least in part on determining that there is a junction, a second lane associated with the junction to facilitate a turn at the junction, that the drive mission includes a turn at the junction, and that the vehicle 702 can merge into the second lane, the planning system 726 can generate an instruction to perform an action that controls the vehicle 702 to merge into the second lane prior to executing the turn.

Figure 11:
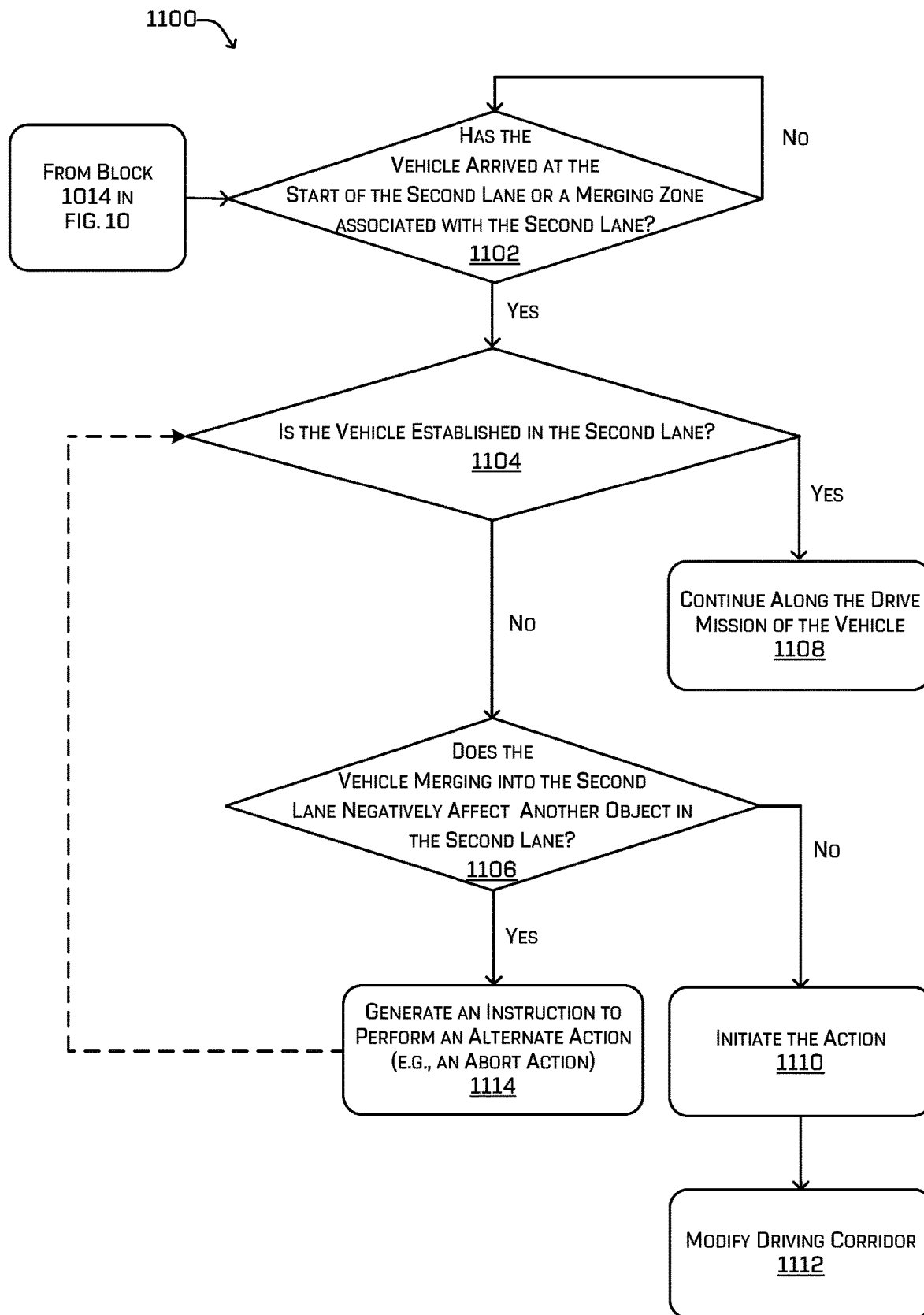
FIG. 11 illustrates another example process for performing lane handling techniques, as described herein.

FIG. 11 illustrates another example process 1200 for performing lane handling techniques, as described herein. The process 1200 can be a continuation of the process 1000 described above.

Block 1102 illustrates determining whether the vehicle has arrived at the start of the second lane or a merging zone associated with the second lane. In at least one example, the planning system 726 can access the map data and/or the sensor data to determine a location of the vehicle 702 relative to the start of the second lane. The planning system 726 can determine whether the location corresponds to the start of the second lane or a merging zone associated with the second lane. In some examples, as described above with reference to FIGS. 1-3, the second lane can be a bike lane, which can be associated with an indicator indicating that the vehicle 702 is to merge, at least partially, into the bike lane prior to executing a turn. In examples where the second lane is a left turn lane or a right turn lane, the lanes may not be associated with such an indicator but may instead start at some distance away from the junction. In both examples, the planning system 726 can access the map data and/or the sensor data to determine a location of the vehicle 702 relative to the start of the second lane. The planning system 726 can determine whether the location corresponds to the start of the second lane or a merging zone associated with the second lane. If the location corresponds to the start of the second lane or the merging zone, the planning system can determine whether the vehicle 702 is established prior to merging into the second lane, as illustrated in block 1104. If the location does not correspond to the start of the second lane or a merging zone associated with the second lane, the planning system 726 can determine an updated location of the vehicle 702 and determine whether the vehicle 702 has arrived at the start of the second lane or a merging zone associated with the second lane.

Block 1104 illustrates determining whether the vehicle is established in the second lane. In at least one example, the planning system 726 can classify lanes, as described above. That is, the planning system 726 can determine a classification associated with the first lane (e.g., the current lane) in which the vehicle 702 is positioned. Additionally, the planning system 726 can determine a classification associated with the second, target lane. If the second lane is associated with any classification other than established, the planning system 726 can perform a cut-in analysis to determine whether the vehicle 702 merging into the second lane negatively affects another object in the second lane, as illustrated in block 1106. If the second lane is associated with the established classification, the planning system 726 can continue along the drive mission of the vehicle 702 (e.g., to drive in the second lane and turn) at the junction, as illustrated in block 1108.

Block 1106 illustrates determining whether the vehicle merging into the second lane negatively affects another object in the second lane. In at least one example, the planning system 726 can analyze sensor data to determine whether the vehicle 702 merging into the second lane negatively affects another object, such as a cyclist, another vehicle, a pedestrian, or the like. That is, the planning system 726 can perform a cut-in analysis to determine whether it is safe for the vehicle 702 to merge into the second lane (e.g., free of collision and/or uncomfortable braking for the other object). As a non-limiting example of discomfort, despite being able to enter the lane, merging may cause the other object to come within a threshold distance of the vehicle and/or decelerate at rate which is uncomfortable for the occupants therein. Based at least in part on determining that the vehicle 702 is not predicted to negatively affect the other object, the planning system 726 can initiate an action to control the vehicle 702 to merge into the second lane and execute a turn in the junction, as illustrated in block 1110.

Block 1110 illustrates initiating the action. In at least one example, the planning system 726 can identify a reference in the second lane. In at least one example, the reference in the second lane can extend at least the length of the merging zone. In at least one example, the planning system 726 can determine a first cost based at least in part on a first distance of the vehicle 702 from the reference associated with the first lane (e.g., the lane in which it is driving) and a second cost based at least in part on a second distance of the vehicle 702 from the reference in the second lane. The planning system 726 can thus cause the vehicle 702 to merge based at least in part on the first cost and the second cost. That is, in at least one example, based at least in part on the first cost and the second cost, the vehicle 702 can modify the reference of the vehicle 702 from the reference of the first lane to the reference of the second lane. Such a modification causes the vehicle 702 switch (laterally) from a first reference in the first lane to a second reference in the second lane. The vehicle 702 can then track (e.g., follow) the second reference in the second lane for the duration of the second lane (e.g., until the location of the vehicle 702 is determined to be associated with the end of the merging zone and/or the second lane).

Block 1112 illustrates modifying a driving corridor associated with the vehicle. As described above, in at least one example, to facilitate the merge into the second lane and the turn, a driving corridor can be dynamically defined and/or modified by the planning system 726 of the vehicle 702. The driving corridor can define the portion of the environment where the vehicle 702 can drive (e.g., a drivable region). In at least one example, the planning system 726 of the vehicle 702 can expand the right side of the driving corridor into the second lane at or near the beginning of the second lane or the merging zone. Additionally, the planning system 726 of the vehicle 702 can cause the left side of the driving corridor to taper to limit the lateral movement of the vehicle 702 (e.g., so that the vehicle 702 does not nudge laterally back into the first lane). In at least one example, the taper can reduce the driving corridor by approximately the width of the second lane, or to a width that is equal to the width of the vehicle 702 plus a predetermined margin. In some examples, the driving corridor can additionally be modified, in near real-time, to accommodate pedestrians (off-road or on-road pedestrians that are determined to be blocking the vehicle 702) and prevent the vehicle 702 from moving laterally toward the pedestrians. In at least one example, after the vehicle 702 makes the turn, the driving corridor can expand on the left side (e.g., to the width of the driving lane). Restricting the left side of the driving corridor during the turn can reduce the nudging or otherwise restrict the lateral motion of the vehicle 702. In at least one example, the planning system 726 can utilize object fusion to modify the driving corridor based at least in part on the presence of objects in the environment, as described above.

Block 1114 illustrates generating an instruction to perform an alternate action. In at least one example, responsive to determining that the vehicle 702 merging into the second lane is predicted to negatively affect another object in the second lane, the planning system 726 can generate an instruction for performing an alternate action, such as an abort action to prevent the vehicle 702 from merging into the second lane, at least temporarily. In some examples, an alternate action can cause the vehicle 702 to slow down or speed up to come within the threshold of negatively affecting the other object (e.g., so as not to negatively affect the other object). In at least one example, the process 1100 can return to block 1104 to determine whether the vehicle merging into the second lane negatively affects another object in the second lane (again).

FIGS. 4 and 5 above describe two examples of abort actions. For example, the planning system 726 of the vehicle 702 may execute an abort action (e.g., instructions associated therewith) to control the vehicle 702 to come to a stop, for example, along the indicator or at the start of the second lane. In some examples, the planning system 726 can consider whether an abort action should be executed while the planning system 726 consider whether an action controlling the vehicle 702 to merge prior to turning right should be executed.

In at least one example, the planning system 726 of the vehicle 702 can determine to execute an abort action (e.g., instructions associated therewith), which controls the vehicle 702 to stop (e.g., and wait until a more opportune time to merge). In some examples, the planning system 726 of the vehicle 702 can determine whether the vehicle 702 is established in the second lane prior to determining whether to execute an abort action (e.g., instructions associated therewith). If the vehicle 702 is established in the second lane, the planning system 726 of the vehicle 702 may refrain from executing the abort action.

In an additional or alternative example, the abort action can control the vehicle 702 to slow down but not come to a complete stop. Instead, the planning system 726 of the vehicle 702 can cause the vehicle 702 to stop lateral motion and continue driving along its current lane bias. In at least one example, the vehicle 702 can track a reference of a lane in which it is driving for the duration of the driving lane. In the abort action described in FIG. 5, the vehicle 702 can maintain a constant lateral lane bias from the driving lane reference (that is the vehicle 702 can track (e.g., follow) a reference that is laterally offset from the reference of the first lane but is not the reference of the second lane). In some examples, if the abort action is initiated prior to the vehicle 702 moving laterally, the vehicle 702 can track the reference of the driving lane, without modifying the reference. However, if the planning system 726 of the vehicle 702 determines to initiate an abort action when the vehicle 702 is moving laterally (e.g., nudging towards the second lane), the vehicle 702 can track that bias (e.g., the reference offset from the reference of the first lane) until the end of the second lane and/or the merging zone associated therewith. That is, in such an example, the vehicle 702 can modify the reference of the vehicle 702 from the reference of the driving lane to another reference to enable the vehicle 702 to follow the other reference until the vehicle 702 executes the turn.

Example Clauses

A. An autonomous vehicle comprising: one or more processors; and computer-readable media storing instructions, that when executed by the one or more processors, cause the autonomous vehicle to perform operations comprising: receiving, from a sensor associated with the autonomous vehicle, sensor data associated with an environment within which the autonomous vehicle is positioned; receiving map data associated with the environment; determining that the autonomous vehicle is to perform a turn; determining, based at least in part on at least one of the sensor data or the map data, that the turn passes through a bike lane disposed proximate a current lane in which the autonomous vehicle is positioned, the bike lane comprising a merging zone indicative of a merging region; determining to merge into the bike lane in the merging zone; determining, based at least in part on the sensor data and the map data, a location of the autonomous vehicle with respect to the merging zone; and causing, based at least in part on the location, the autonomous vehicle to merge into the bike lane prior to performing the turn.

B. The autonomous vehicle as paragraph A recites, the operations further comprising: determining a first reference line with the current lane of the autonomous vehicle about which the autonomous vehicle is to follow while in the current lane; determining a second reference line associated with at least the merging zone along which the autonomous vehicle is to follow while in the bike lane; determining a first cost based at least in part on a first distance of the autonomous vehicle from the first reference line; and determining a second cost based at least in part on a second distance of the autonomous vehicle from the second reference line, wherein causing the autonomous vehicle to merge into the bike lane is based at least in part on the first cost and the second cost.

C. The autonomous vehicle as paragraph B recites, the operations further comprising causing the autonomous vehicle to turn into a driving lane based at least in part on: determining, at an end of the bike lane, a target lane of the autonomous vehicle, wherein the target lane is a driving lane; determining a third reference line associated with the target lane along which the autonomous vehicle is to travel while in the target lane; and determining a third cost associated with a distance of the autonomous vehicle from the third reference line, wherein causing the autonomous vehicle to turn into the driving lane is based at least in part on the third cost.

D. A method comprising: receiving map data associated with an environment within which a vehicle is positioned, wherein the vehicle is positioned in a first lane of the map data; determining that the vehicle is to perform a turn; determining, based at least in part on the map data, a start of a second lane associated with the turn or a merging zone associated with the second lane; determining, based at least in part on the map data, a location of the vehicle relative to the start of the second lane or the merging zone associated with the second lane; and causing, based at least in part on the location, the vehicle to merge into the second lane prior to performing the turn.

E. The method as paragraph D recites, wherein the second lane is associated with a bike lane and the start of the second lane or the merging zone is associated with a dashed line boundary.

F. The method as paragraph D or E recites, wherein the second lane is associated with a parking lane or a bus lane designated in the map data.

G. The method as any of paragraphs D-F recite, further comprising: determining a start of an additional reference line that is associated with the second lane; and determining the start of the second lane or a merging zone associated with the second lane based at least in part on determining a presence of the additional reference line associated with the second lane.

H. The method as any of paragraphs D-G recite, further comprising: determining a first classification associated with a current lane within which the vehicle is positioned, wherein the first classification comprises at least one of occupied, unoccupied, or established, the classification indicative of whether the vehicle is in the current lane and whether the vehicle has priority over other objects in the current lane; determining a second classification associated with the second lane; and causing the vehicle to merge into the second lane based at least in part on the first classification and the second classification.

I. The method as any of paragraphs D-H recite, further comprising, prior to causing the vehicle to merge into the second lane, performing an analysis to determine (i) whether another object occupies at least a threshold of the second lane and (ii) whether the vehicle merging into the second lane is predicted to negatively affect the other object.

J. The method as paragraph I recites, further comprising: determining that the vehicle has established priority in the second lane; and terminating the analysis based at least in part on determining that the vehicle has established priority in the second lane.

K. The method as any of paragraphs D-J recite, further comprising: determining, as a safety signal, that at least one of (i) an object comprising a bicycle or a second vehicle has established priority in the second lane or (ii) the vehicle merging into the second lane affects the object; and responsive to the safety signal, performing an alternative action to at least temporarily prevent the vehicle from merging into the second lane.

L. The method as any of paragraphs D-K recite, further comprising: determining a first reference line with the first lane about which the vehicle is to follow while in the first lane; determining a second reference line associated with at least a portion of the second lane about which the vehicle is to follow while in the second lane; determining a first cost based at least in part on a first distance of the vehicle from the first reference line; and determining a second cost based at least in part on a second distance of the vehicle from the second reference line, wherein causing the vehicle to merge into the second lane is based at least in part on the first cost and the second cost.

M. The method as paragraph L recites, further comprising causing the vehicle to turn into the first lane based at least in part on: determining, at an end of the second lane, a target lane of the vehicle, wherein the target lane is the first lane; determining a third reference line associated with the target lane along which the vehicle is to travel while in the target lane; and determining a third cost associated with a distance of the vehicle from the third reference line, wherein causing the vehicle to turn into the first lane is based at least in part on the third cost.

N. One or more non-transitory computer-readable media storing instructions, that when executed by one or more processors, cause a vehicle to perform operations comprising: receiving map data associated with an environment within which the vehicle is positioned, wherein the vehicle is positioned in a first lane of the map data; determining that the vehicle is to perform a turn; determining, based at least in part on the map data, a start of a second lane associated with the turn or a merging zone associated with the second lane; determining, based at least in part on the map data, a location of the vehicle relative to the start of the second lane or the merging zone associated with the second lane; and causing, based at least in part on the location, the vehicle to merge into the second lane prior to performing the turn.

O. The one or more non-transitory computer-readable media as paragraph N recites, the operations further comprising: determining a first classification associated with a current lane within which the vehicle is positioned, wherein the first classification comprises at least one of occupied, unoccupied, or established; determining a second classification associated with the second lane; and causing the vehicle to merge into the second lane based at least in part on the first classification and the second classification.

P. The one or more non-transitory computer-readable media as paragraph N or O recites, the operations further comprising: determining a first reference line with the first lane about which the vehicle is to follow while in the first lane; determining a second reference line associated with at least a portion of the second lane about which the vehicle is to follow while in the second lane; determining a first cost based at least in part on a first distance of the vehicle from the first reference line; and determining a second cost based at least in part on a second distance of the vehicle from the second reference line, wherein causing the vehicle to merge into the second lane is based at least in part on the first cost and the second cost.

Q. The one or more non-transitory computer-readable media as any of paragraphs N-P recite, the operations further comprising causing the vehicle to turn into the first lane based at least in part on: determining, at an end of the second lane, a target lane of the vehicle, wherein the target lane is the first lane; determining a third reference line associated with the target lane along which the vehicle is to travel while in the target lane; and determining a third cost associated with a distance of the vehicle from the third reference line, wherein causing the vehicle to turn into the first lane is based at least in part on the third cost.

R. The one or more non-transitory computer-readable media as any of paragraphs N-Q recite, the operations further comprising at least one of defining or modifying at least a width of a driving corridor associated with the vehicle in association with at least one of (i) the vehicle merging into the second lane or (ii) the turn.

S. The one or more non-transitory computer-readable media as paragraph R recites, the operations further comprising at least one of defining or modifying at least the width of the driving corridor to an original width upon completion of the turn.

T. The one or more non-transitory computer-readable media as any of paragraphs N-S recite, the operations further comprising: determining, as a safety signal, that at least one of (i) an object comprising a bicycle or a second vehicle has established priority in the second lane or (ii) the vehicle merging into the second lane affects the object; and responsive to the safety signal, performing an alternative action to at least temporarily prevent the vehicle from merging into the second lane.

U. An autonomous vehicle comprising: one or more processors; and computer-readable media storing instructions, that when executed by the one or more processors, cause the one or more processors to perform operations comprising: receiving, from a sensor associated with the autonomous vehicle, sensor data associated with an environment within which the autonomous vehicle is positioned; receiving map data indicating a lane in the environment; determining, based at least in part on at least one of the sensor data or the map data, a signal indicative of a presence of the autonomous vehicle in the lane; determining a classification of the lane based at least in part on the signal, wherein any lane that is occupied by at least a portion of the autonomous vehicle is classified as at least one of: an occupied lane, indicating that the autonomous vehicle occupies at least some portion of the lane; or an established lane, indicating that the autonomous vehicle has established priority in the lane; and controlling the autonomous vehicle based at least in part on the classification of the lane.

V. The autonomous vehicle as paragraph U recites, wherein determining the signal indicative of the presence of the autonomous vehicle in the lane is based at least in part on at least one of: a position of a front bumper of the autonomous vehicle; a dimension of a bounding box associated with the autonomous vehicle relative to a lane reference of the lane; an area of the bounding box associated with the autonomous vehicle; or a ratio of a first width of the lane that is occupied by the autonomous vehicle to a second width of the lane that is unoccupied.

W. The autonomous vehicle as paragraph U or V recites, wherein determining the classification of the lane comprises: determining, based at least in part on the signal, that the portion of the autonomous vehicle that occupies the lane is less than a threshold; and determining that the lane is classified as the occupied lane and not the established lane.

X. The autonomous vehicle as any of paragraphs U-W recite, wherein determining the classification of the lane comprises: determining, based at least in part on the signal, that the portion of the autonomous vehicle that occupies the lane meets or exceeds a threshold; and determining that the lane is classified as the occupied lane and the established lane.

Y. The autonomous vehicle as any of paragraphs U-X recite, wherein determining the classification of the lane comprises: determining, based at least in part on the signal, that an unoccupied portion of the lane is less than a threshold; and determining that the lane is classified as the occupied lane and the established lane.

Z. The autonomous vehicle as any of paragraphs U-Y recite, wherein determining the classification of the lane comprises: determining a lateral velocity of the autonomous vehicle towards the lane; determining that the lateral velocity meets or exceeds a threshold; and determining that the lane is classified as the occupied lane and the established lane based at least in part on the lateral velocity meeting or exceeding the threshold.

AA. A method comprising: determining, by one or more computing devices of a vehicle, a signal indicative of a presence of the vehicle in a lane of a drivable surface in an environment within which the vehicle is located; determining, by the one or more computing devices of the vehicle, a classification of the lane based at least in part on the signal, wherein any lane that is occupied by at least a portion of the vehicle is classified as at least one of: an occupied lane, indicating that at least a portion of the vehicle occupies the lane; or an established lane, indicating that the vehicle has established priority in the lane; controlling, by the one or more computing devices of the vehicle, the vehicle based at least in part on the classification of the lane.

AB. The method as paragraph AA recites, wherein controlling the vehicle comprises: receiving an indication that a target lane is not classified as an established lane; and based at least in part on the indication that the target lane is not classified as an established lane, performing an analysis associated with the target lane to determine (i) whether another object occupies at least a threshold of the target lane and (ii) whether the vehicle merging into the target lane is predicted to negatively affect the other object.

AC. The method as paragraph AA or AB recites, wherein controlling the vehicle comprises: determining a first classification of at least one lane left of the vehicle or a second classification of at least one lane right of the vehicle; and determining an action for controlling the vehicle based at least in part on the first classification or the second classification.

AD. The method as any of paragraphs AA-AC recite, wherein the lane occupancy is based on at least one of sensor data received from a sensor associated with the vehicle or map data associated with the environment.

AE. The method as any of paragraphs AA-AD recite, wherein determining the signal indicative of the presence of the vehicle in the lane is based at least in part on at least one of: a position of a front bumper of the vehicle; a dimension of a bounding box associated with the vehicle relative to a lane reference of the lane; an area of the bounding box associated with the vehicle; or a ratio of a first width of the lane that is occupied by the vehicle to a second width of the lane that is unoccupied.

AF. The method as any of paragraphs AA-AE recite, wherein determining the classification of the lane comprises: determining, based at least in part on the signal, that the portion of the vehicle that occupies the lane is less than a threshold; and determining that the lane is classified as the occupied lane and not the established lane.

AG. The method as any of paragraphs AA-AF recite, wherein determining the classification of the lane comprises: determining, based at least in part on the signal, that the portion of the vehicle that occupies the lane meets or exceeds a threshold; and determining that the lane is classified as the occupied lane and the established lane.

AH. The method as any of paragraphs AA-AG recite, wherein determining the classification of the lane comprises: determining, based at least in part on the signal, that an unoccupied portion of the lane is less than a threshold; and determining that the lane is classified as the occupied lane and the established lane.

AI. One or more non-transitory computer-readable media storing instructions, that when executed by one or more processors, cause a vehicle to perform operations comprising: determining, by one or more computing devices of the vehicle, a signal indicative of a presence of the vehicle in a lane of a drivable surface in an environment within which the vehicle is located; determining, by the one or more computing devices of the vehicle, a classification of the lane based at least in part on the signal, wherein any lane that is occupied by at least a portion of the vehicle is classified as at least one of: an occupied lane, indicating that at least a portion of the vehicle occupies the lane; or an established lane, indicating that the vehicle has established priority in the lane; controlling, by the one or more computing devices of the vehicle, the vehicle based at least in part on the classification of the lane.

AJ. The one or more non-transitory computer-readable media as paragraph AI recites, wherein determining the signal indicative of the presence of the vehicle in the lane is based at least in part on at least one of: a position of a front bumper of the vehicle; a dimension of a bounding box associated with the vehicle relative to a lane reference of the lane; an area of the bounding box associated with the vehicle; or a ratio of a first width of the lane that is occupied by the vehicle to a second width of the lane that is unoccupied.

AK. The one or more non-transitory computer-readable media as paragraph AI or AJ recites, wherein determining the classification of the lane comprises: determining, based at least in part on the signal, that the portion of the vehicle that occupies the lane is less than a threshold; and determining that the lane is classified as the occupied lane and not the established lane.

AL. The one or more non-transitory computer-readable media as any of paragraphs AI-AK recite, wherein determining the classification of the lane comprises: determining, based at least in part on the signal, that the portion of the vehicle that occupies the lane meets or exceeds a threshold; and determining that the lane is classified as the occupied lane and the established lane.

AM. The one or more non-transitory computer-readable media as any of paragraphs AI-AL recite, wherein determining the classification of the lane comprises: determining, based at least in part on the signal, that an unoccupied portion of the lane is less than a threshold; and determining that the lane is classified as the occupied lane and the established lane.

AN. The one or more non-transitory computer-readable media as any of paragraphs AI-AM recite, wherein controlling the vehicle comprises: receiving an indication that a target lane is not classified as an established lane; and based at least in part on the indication that the target lane is not classified as an established lane, performing an analysis associated with the target lane to determine (i) whether another object occupies at least a threshold of the target lane and (ii) whether the vehicle merging into the target lane is predicted to negatively affect the other object.

While the example clauses described above are described with respect to one particular implementation, it should be understood that, in the context of this document, the content of the example clauses can also be implemented via a method, device, system, a computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. An autonomous vehicle comprising:
one or more processors; and
computer-readable media storing instructions, that when executed by the one or more processors, cause the one or more processors to perform operations comprising:
receiving, from a sensor associated with the autonomous vehicle, sensor data associated with an environment within which the autonomous vehicle is positioned;
receiving map data indicating a lane in the environment;
determining, based at least in part on at least one of the sensor data or the map data, a signal indicative of a presence of the autonomous vehicle in the lane;
determining a lateral velocity of the autonomous vehicle towards the lane;
determining, based at least in part on the signal and the lateral velocity meeting or exceeding a threshold, a classification of the lane, wherein any lane that is occupied by at least a portion of the autonomous vehicle is classified as at least one of:
an occupied lane, indicating that the autonomous vehicle occupies at least some portion of the lane; or
an established lane, indicating that the autonomous vehicle has established priority in the lane;
and
controlling the autonomous vehicle based at least in part on the classification of the lane.

2. The autonomous vehicle as claim 1 recites, wherein determining the signal indicative of the presence of the autonomous vehicle in the lane is based at least in part on at least one of:
a position of a front bumper of the autonomous vehicle;
a dimension of a bounding box associated with the autonomous vehicle relative to a lane reference of the lane;
an area of the bounding box associated with the autonomous vehicle; or
a ratio of a first width of the lane that is occupied by the autonomous vehicle to a second width of the lane that is unoccupied.

3. The autonomous vehicle as claim 1 recites, wherein determining the classification of the lane comprises:
determining, based at least in part on the signal, that the portion of the autonomous vehicle that occupies the lane is less than a threshold; and
determining that the lane is classified as the occupied lane and not the established lane.

4. The autonomous vehicle as claim 1 recites, wherein determining the classification of the lane comprises:
determining, based at least in part on the signal, that the portion of the autonomous vehicle that occupies the lane meets or exceeds a threshold; and
determining that the lane is classified as the occupied lane and the established lane.

5. The autonomous vehicle as claim 1 recites, wherein determining the classification of the lane comprises:
determining, based at least in part on the signal, that an unoccupied portion of the lane is less than a threshold; and
determining that the lane is classified as the occupied lane and the established lane.

6. A method comprising:
determining, by one or more computing devices of a vehicle, a signal indicative of a presence of the vehicle in a lane of a drivable surface in an environment within which the vehicle is located;
determining, by the one or more computing devices of the vehicle, a lateral velocity of the vehicle towards the lane;
determining, by the one or more computing devices of the vehicle, based at least in part on the signal and the lateral velocity meeting or exceeding a threshold, a classification of the lane, wherein any lane that is occupied by at least a portion of the vehicle is classified as at least one of:
an occupied lane, indicating that at least a portion of the vehicle occupies the lane; or
an established lane, indicating that the vehicle has established priority in the lane;
and
controlling, by the one or more computing devices of the vehicle, the vehicle based at least in part on the classification of the lane.

7. The method as claim 6 recites, wherein controlling the vehicle comprises:
receiving an indication that a target lane is not classified as an established lane; and
based at least in part on the indication that the target lane is not classified as an established lane, performing an analysis associated with the target lane to determine (i) whether another object occupies at least a threshold of the target lane and (ii) whether the vehicle merging into the target lane is predicted to negatively affect the other object.

8. The method as claim 6 recites, wherein controlling the vehicle comprises:
determining a first classification of at least one lane left of the vehicle or a second classification of at least one lane right of the vehicle; and
determining an action for controlling the vehicle based at least in part on the first classification or the second classification.

9. The method as claim 6 recites, wherein the lane occupancy is based on at least one of sensor data received from a sensor associated with the vehicle or map data associated with the environment.

10. The method as claim 6 recites, wherein determining the signal indicative of the presence of the vehicle in the lane is based at least in part on at least one of:
a position of a front bumper of the vehicle;
a dimension of a bounding box associated with the vehicle relative to a lane reference of the lane;
an area of the bounding box associated with the vehicle; or
a ratio of a first width of the lane that is occupied by the vehicle to a second width of the lane that is unoccupied.

11. The method as claim 6 recites, wherein determining the classification of the lane comprises:
determining, based at least in part on the signal, that the portion of the vehicle that occupies the lane is less than a threshold; and
determining that the lane is classified as the occupied lane and not the established lane.

12. The method as claim 6 recites, wherein determining the classification of the lane comprises:
determining, based at least in part on the signal, that the portion of the vehicle that occupies the lane meets or exceeds a threshold; and
determining that the lane is classified as the occupied lane and the established lane.

13. The method as claim 6 recites, wherein determining the classification of the lane comprises:
- determining, based at least in part on the signal, that an unoccupied portion of the lane is less than a threshold; and
- determining that the lane is classified as the occupied lane and the established lane.

14. One or more non-transitory computer-readable media storing instructions, that when executed by one or more processors, cause a vehicle to perform operations comprising:
- determining, by one or more computing devices of the vehicle, a signal indicative of a presence of the vehicle in a lane of a drivable surface in an environment within which the vehicle is located;
- determining, by the one or more computing devices of the vehicle, a lateral velocity of the vehicle towards the lane;
- determining, by the one or more computing devices of the vehicle, based at least in part on the signal and the lateral velocity meeting or exceeding a threshold, a classification of the lane, wherein any lane that is occupied by at least a portion of the vehicle is classified as at least one of:
  - an occupied lane, indicating that at least a portion of the vehicle occupies the lane; or
  - an established lane, indicating that the vehicle has established priority in the lane;

and

- controlling, by the one or more computing devices of the vehicle, the vehicle based at least in part on the classification of the lane.

15. The one or more non-transitory computer-readable media as claim 14 recites, wherein determining the signal indicative of the presence of the vehicle in the lane is based at least in part on at least one of:
- a position of a front bumper of the vehicle;
- a dimension of a bounding box associated with the vehicle relative to a lane reference of the lane;
- an area of the bounding box associated with the vehicle; or
- a ratio of a first width of the lane that is occupied by the vehicle to a second width of the lane that is unoccupied.

16. The one or more non-transitory computer-readable media as claim 14 recites, wherein determining the classification of the lane comprises:
- determining, based at least in part on the signal, that the portion of the vehicle that occupies the lane is less than a threshold; and
- determining that the lane is classified as the occupied lane and not the established lane.

17. The one or more non-transitory computer-readable media as claim 14 recites, wherein determining the classification of the lane comprises:
- determining, based at least in part on the signal, that the portion of the vehicle that occupies the lane meets or exceeds a threshold; and
- determining that the lane is classified as the occupied lane and the established lane.

18. The one or more non-transitory computer-readable media as claim 14 recites, wherein determining the classification of the lane comprises:
- determining, based at least in part on the signal, that an unoccupied portion of the lane is less than a threshold; and
- determining that the lane is classified as the occupied lane and the established lane.

19. The one or more non-transitory computer-readable media as claim 14 recites, wherein controlling the vehicle comprises:
- receiving an indication that a target lane is not classified as an established lane; and
- based at least in part on the indication that the target lane is not classified as an established lane, performing an analysis associated with the target lane to determine (i) whether another object occupies at least a threshold of the target lane and (ii) whether the vehicle merging into the target lane is predicted to negatively affect the other object.

20. The autonomous vehicle as claim 1 recites, wherein determining the classification of a lane is based at least in part on an amount of unoccupied space in the lane being less than a threshold.

* * * * *